(12) United States Patent
Yang et al.

(10) Patent No.: US 10,462,740 B2
(45) Date of Patent: Oct. 29, 2019

(54) SYSTEM AND METHOD FOR WAKING UP A RADIO COMMUNICATIONS MODULE OF A DEVICE

(71) Applicant: Futurewei Technologies, Inc., Plano, TX (US)

(72) Inventors: Yunsong Yang, San Diego, CA (US); Zhigang Rong, San Diego, CA (US); Zhenguo Du, Shenzhen (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 68 days.

(21) Appl. No.: 15/648,945

(22) Filed: Jul. 13, 2017

(65) Prior Publication Data
US 2018/0041959 A1 Feb. 8, 2018

Related U.S. Application Data

(60) Provisional application No. 62/370,509, filed on Aug. 3, 2016.

(51) Int. Cl.
*G08C 17/00* (2006.01)
*H04W 52/02* (2009.01)
(Continued)

(52) U.S. Cl.
CPC ...... *H04W 52/0216* (2013.01); *H04B 1/3805* (2013.01); *H04W 52/028* (2013.01);
(Continued)

(58) Field of Classification Search
CPC ......... H04W 52/0216; H04W 52/0229; H04W 52/265; H04W 88/02; H04W 88/08; H04B 1/3805
See application file for complete search history.

(56) References Cited

U.S. PATENT DOCUMENTS

2001/0041551 A1* 11/2001 Rotzoll ............. H04W 52/0229
455/343.2
2005/0054389 A1* 3/2005 Lee .................... H04W 52/0225
455/574
(Continued)

FOREIGN PATENT DOCUMENTS

CN 101828340 A 9/2010
CN 101877885 A 11/2010
(Continued)

OTHER PUBLICATIONS

Park, et al., "Low-Power Wake-Up Receiver (LP-WUR) for 802.11," IEEE 802.11-15/1307r1, Nov. 10, 2015, 18 pages.
(Continued)

*Primary Examiner* — Stephen M D'Agosta
(74) *Attorney, Agent, or Firm* — Slater Matsil, LLP

(57) ABSTRACT

A method for method for waking up one of a plurality of radio communications modules (RCMs) of a first station includes receiving a wake-up configuration from a second station, placing the plurality of RCMs into a sleeping mode, receiving a wake-up signal from the second station on an auxiliary low-power radio receiver of the first station, determining a first RCM of the plurality of RCMs to wake up in accordance with the wake-up configuration, and waking up the first RCM from the sleeping mode to communicate with the second station.

21 Claims, 11 Drawing Sheets

(51) Int. Cl.
*H04W 52/26* (2009.01)
*H04B 1/3805* (2015.01)
*H04W 88/02* (2009.01)
*H04W 88/08* (2009.01)

(52) U.S. Cl.
CPC ..... *H04W 52/0229* (2013.01); *H04W 52/265* (2013.01); *H04W 88/02* (2013.01); *H04W 88/08* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/166* (2018.01); *Y02D 70/26* (2018.01)

(56) References Cited

U.S. PATENT DOCUMENTS

| | | |
|---|---|---|
| 2006/0205444 A1 | 9/2006 | Aerrabotu et al. |
| 2009/0129306 A1* | 5/2009 | Twitchell, Jr. .... H04W 52/0235 370/311 |
| 2010/0099358 A1* | 4/2010 | Kumar ................. H04B 1/1615 455/41.3 |
| 2010/0329162 A1 | 12/2010 | Kadous et al. |
| 2011/0116430 A1* | 5/2011 | Kim ................. H04W 52/0229 370/311 |
| 2011/0140851 A1* | 6/2011 | Lee ................... H04W 52/0235 340/9.1 |
| 2013/0003709 A1* | 1/2013 | Kalhan ................. H04W 76/15 370/338 |
| 2013/0294312 A1 | 11/2013 | Chen et al. |
| 2014/0050133 A1 | 2/2014 | Jafarian et al. |
| 2014/0078950 A1 | 3/2014 | Jung |
| 2014/0112224 A1* | 4/2014 | Jafarian ............ H04W 52/0209 370/311 |
| 2014/0126442 A1* | 5/2014 | Jafarian ............ H04W 52/0212 370/311 |

FOREIGN PATENT DOCUMENTS

| | | |
|---|---|---|
| CN | 102474875 A | 5/2012 |
| CN | 104584649 A | 4/2015 |

OTHER PUBLICATIONS

Park, et al., "LP-WUR (Low-Power Wake-Up Receiver): Enabling Low-Power and Low-Latency Capability for 802.11," IEEE 802.11-16/0027r0, Jan. 18, 2016, 21 pages.

Park, et al., "LP-WUR (Low-Power Wake-Up Receiver) Follow-Up," IEEE 802.11-16/0341r0, Mar. 14, 2016, 9 pages.

* cited by examiner

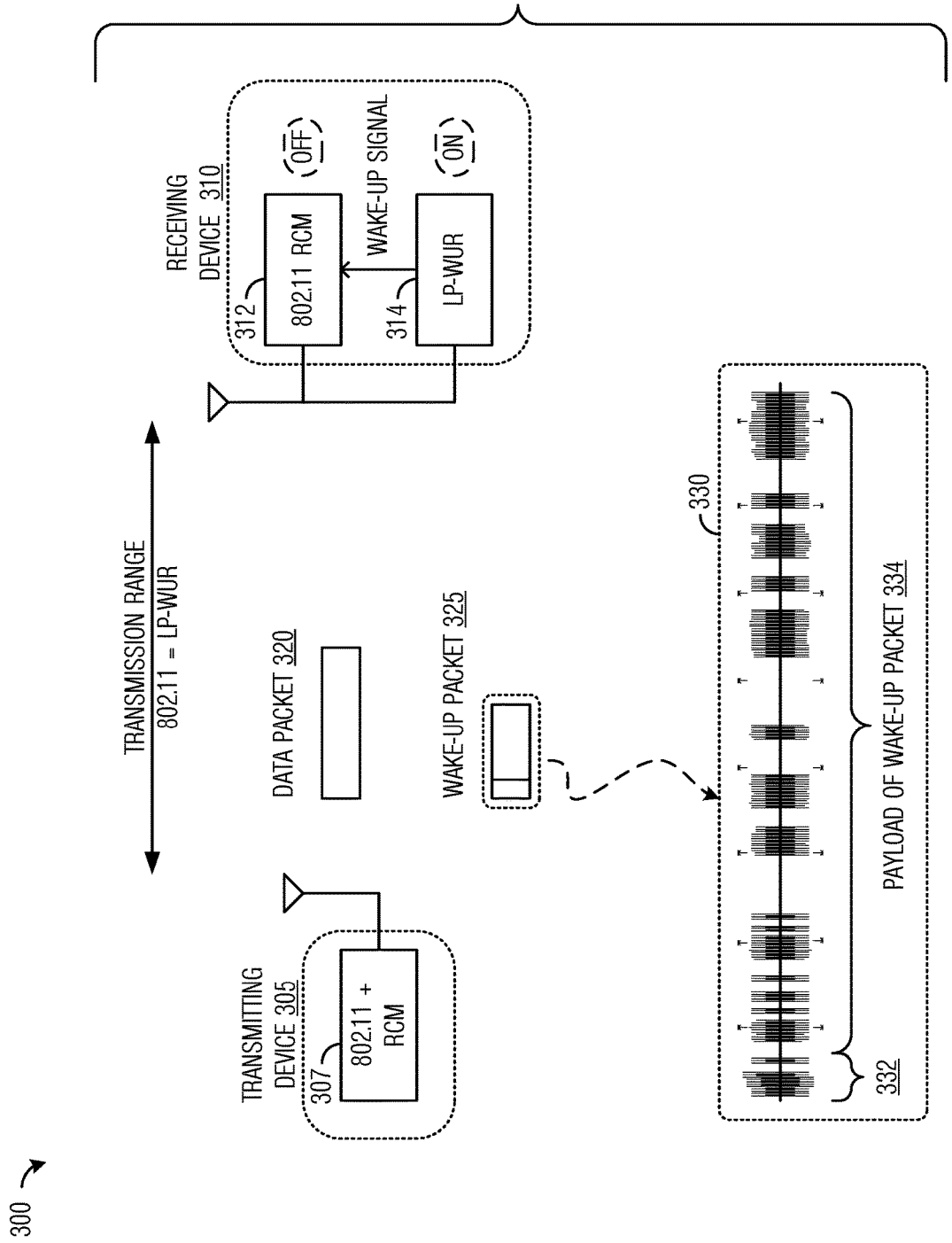

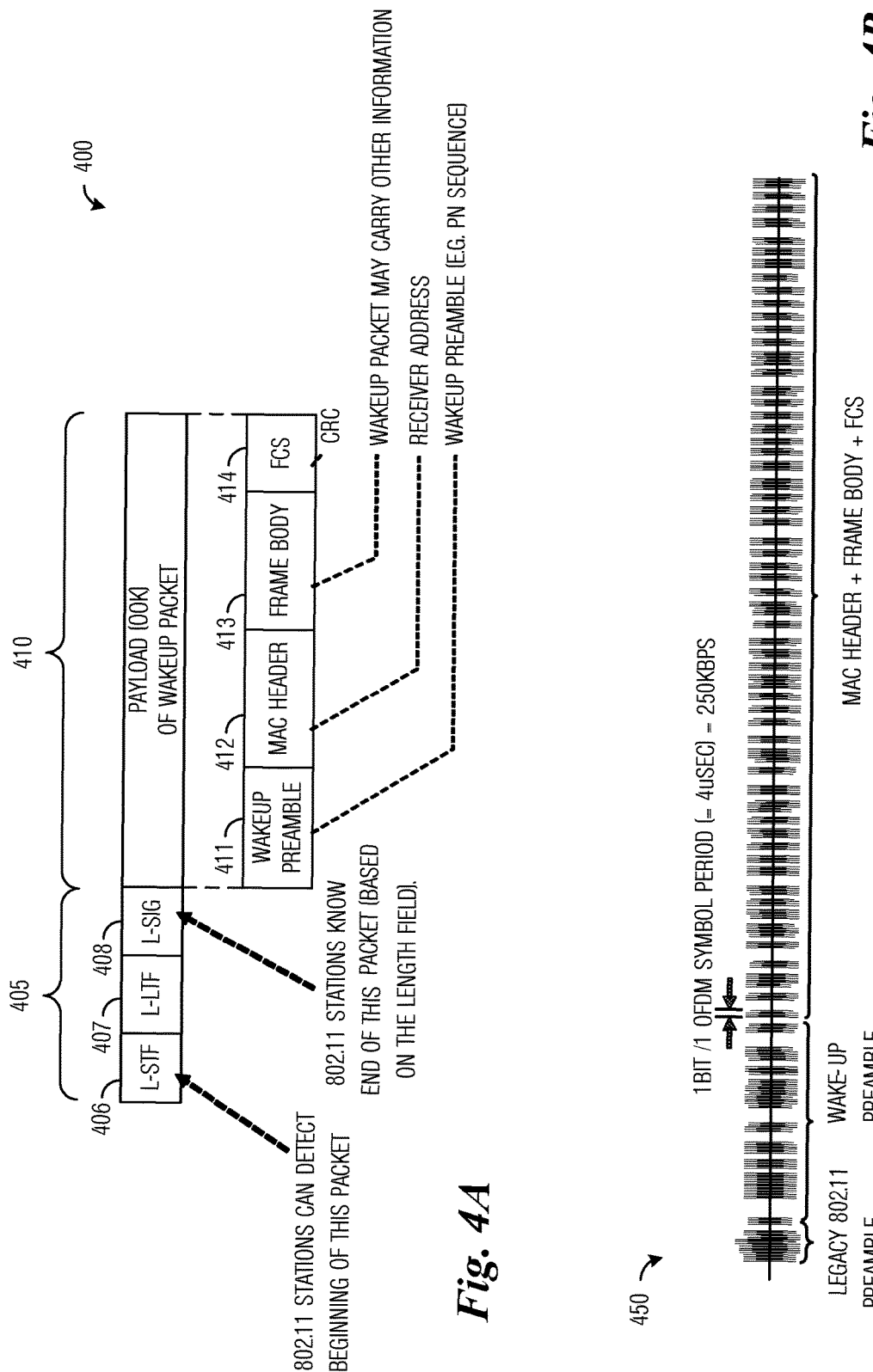

SYSTEM AND METHOD FOR WAKING UP A RADIO COMMUNICATIONS MODULE OF A DEVICE

This application claims the benefit of U.S. Provisional Application No. 62/370,509, filed on Aug. 3, 2016, entitled "System and Method for Waking Up a Radio Communications Module of a Device," which application is hereby incorporated herein by reference.

TECHNICAL FIELD

The present invention relates generally to a system and method for digital communications, and, in particular embodiments, to a system and method for waking up a radio communications module (RCM) of a device.

BACKGROUND

Power consumption is a key consideration in devices that are battery powered. A design criterion for a battery powered device is to minimize power consumption to extend the period of time between battery recharges or replacement as much as possible. In some deployments, such as remotely located sensors, battery replacement may be both impractical as well as expensive. Even in situations where the battery powered device is readily available and recharging is easy, such as in cellular telephones, tablets, laptop computers, wearable devices (WDs), and so on, recharging the battery is still an inconvenient and time consuming task.

Radio communications modules (RCMs), which provide wireless connectivity that is so vital to the operation of these battery powered devices, is also a significant source of power consumption. The problem is only magnified when a single device includes a plurality of RCMs. Therefore, there is a need to reduce power consumption in battery powered devices with RCMs.

SUMMARY

Example embodiments provide a system and method for waking up a radio communications module (RCM) of a station.

In accordance with an example embodiment, a method for waking up one of a plurality of radio communications modules (RCMs) of a first station is provided. The method includes receiving, by the first station, a wake-up configuration from a second station, placing, by the first station, the plurality of RCMs of the first station into a sleeping mode, receiving, by the first station, a wake-up signal from the second station on an auxiliary low-power radio receiver of the first station, determining, by the first station, a first RCM of the plurality of RCMs to wake up in accordance with the wake-up configuration, and waking up, by the first station, the first RCM from the sleeping mode to communicate with the second station.

The method includes communicating, by the first station, with the second station to determine the wake-up configuration. Communicating with the second station to determine the wake-up configuration is performed using either the first RCM or a second RCM of the plurality of RCMs, where the second RCM is different from the first RCM. The wake-up configuration is determined in accordance with one or more of a power consumption requirement comparing a power consumption of each RCM of the first station, a latency requirement comparing a latency associated with waking up each RCM of the first station, a Quality of Service (QoS) requirement of an anticipated data transmission comparing QoS requirements supported by each of the RCMs of the first station, a range requirement comparing an estimated range between the first station and the second station with a communications range supported by each of the RCMs of the first station, or historical and usage information of the first station.

The wake-up configuration includes an indication of the first RCM. The wake-up configuration includes mappings of mapping indicator values to RCMs of the plurality of RCMs of the first station, the wake-up signal includes a mapping indicator, and determining the first RCM includes selecting the first RCM in accordance with the mappings and the mapping indicator. The method includes transmitting, by the first station, a RCM wake up indicator to the second station, detecting, by the first station, a time-out prior to receiving a response from the second station on the first RCM, determining, by the first station, a third RCM of the plurality of RCMs of the first station to wake up, waking up, by the first station, the third RCM, and communicating, by the first station, with the second station using the third RCM after waking up the third RCM.

In accordance with an example embodiment, a method for communicating with a first station having a plurality of RCMs is provided. The method includes transmitting, by a second station, a wake-up configuration for the first station, placing, by the second station, the plurality of RCMs of the first station into a sleeping mode, transmitting, by the second station, a wake-up signal intended for the first station, the wake-up signal configured to wake up a first RCM of the plurality of RCMs in accordance with the wake-up configuration, receiving, by the second station, a wake-up indication from a second RCM of the plurality of RCMs of the first station, and communicating, by the second station, data with the first station using a third RCM of the second station associated with the second RCM of the plurality of RCMs of the first station.

The wake-up configuration comprises an indication of the first RCM. The method includes communicating, by the second station, with the first station to determine the wake-up configuration. Communicating with the first station to determine the wake-up configuration is performed using a fourth RCM of the second station associated with one of the first RCM or a fifth RCM of the plurality of RCMs of the first station that is different from the first RCM.

The wake-up configuration is determined in accordance with one or more of a power consumption requirement comparing a power consumption of each RCM of the first station, a latency requirement comparing a latency associated with waking up each RCM of the first station, a Quality of Service (QoS) requirement of an anticipated data transmission comparing QoS requirements supported by each of the RCMs of the first station, a range requirement comparing an estimated range between the first station and the second station with a communications range supported by each of the RCMs of the first station, or historical and usage information of the first station.

The wake-up configuration includes mappings of mapping indicator values to RCMs the plurality of RCMs of the first station, the wake-up signal includes a mapping indicator, and the method further includes determining, by the second station, a value of the mapping indicator in the wake-up signal that corresponds to the first RCM in accordance with the mappings.

In accordance with an example embodiment, a first station is provided. The first station includes a processor, and a computer readable storage medium storing programming for execution by the processor. The programming including instructions to configure the first station to receive a wake-up configuration from a second station, place a plurality of RCMs of the first station into a sleeping mode, receive a wake-up signal from the second station on an auxiliary low-power radio receiver of the first station, determine a first RCM of the plurality of RCMs to wake up in accordance with the wake-up configuration, and wake up the first RCM from the sleeping mode to communicate with the second station.

The programming includes instructions to configure the first station to communicate with the second station to determine the wake-up configuration. The wake-up configuration includes an indication of the first RCM. The wake-up configuration includes mappings of mapping indicator values to RCMs of the plurality of RCMs of the first station, the wake-up signal includes a mapping indicator, and the programming includes instructions to configure the first station to select the first RCM in accordance with the mappings and the mapping indicator.

The programming includes instructions to configure the first station to transmit a RCM wake up indicator to the second station, detect a time-out prior to receiving a response from the second station on the first RCM, determine a third RCM of the plurality of RCMs of the first station to wake up, wake up the third RCM, and communicate with the second station using the third RCM after waking up the third RCM.

In accordance with an example embodiment, a second station adapted to communicate with a first station having a plurality of RCMs is provided. The second station includes a processor, and a computer readable storage medium storing programming for execution by the processor. The programming including instructions to configure the second station to transmit a wake-up configuration for a first station, place a plurality of RCMs of the first station into a sleeping mode, transmit a wake-up signal intended for the first station, the wake-up signal configured to wake up a first RCM of the plurality of RCMs in accordance with the wake-up configuration, receive a wake-up indication from a second RCM of the plurality of RCMs of the first station, and communicate data with the first station using a third RCM of the second station associated with the second RCM of the plurality of RCMs of the first station.

The programming includes instructions to configure the second station to communicate with the first station to determine the wake-up configuration. The wake-up configuration includes mappings of mapping indicator values to RCMs the plurality of RCMs of the first station, the wake-up signal includes a mapping indicator, and the programming includes instructions to configure the second station to determine a value of the mapping indicator in the wake-up signal that corresponds to the first RCM in accordance with the mappings.

Practice of the foregoing embodiments enables the placing of inactive RCMs of a device that are power hungry into an inactive mode to reduce power consumption, as well as simplifying the wake up process to ensure that as little power is consumed as possible.

Practice of the foregoing embodiments also enables a single low power wake-up receiver to wake up any one of a plurality of RCMs, therefore, a single active low power wake-up receiver is sufficient per device, thereby further increasing the power consumption reduction.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 is an example IEEE 802.11 communications system with a low-power wake-up radio;

FIG. 4A illustrates a detailed view of an example wake-up packet according to example embodiments described herein;

FIG. 4B illustrates an example wake-up packet according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to systems and methods for waking up a radio communications module (RCM) of a device. For example, a system and a method are described herein to allow a receiving device to have a single (or only a single) wake-up receiver that is capable of waking up any one of the RCMs present in the receiving device when the wake-up receiver receives a wake-up signal from a transmitting device. The transmitting device can specify which RCM at the receiving device to wake up in the wake-up signal or the transmitting device and the receiving device can coordinate beforehand to determine which RCM at the receiving device to wake up. Alternatively, the receiving device can determine which RCM to wake up upon receipt of the wake-up signal. As an example, the receiving device can wake up RCMs based on a criterion, which includes a power consumption requirement comparing a power consumption of each RCM of the receiving device, a latency requirement comparing a latency associated with waking up each RCM of the receiving device, a Quality of Service (QoS) requirement of an anticipated data transmission comparing QoS requirements supported by each of the RCMs of the receiving device, a range requirement comparing an estimated range between the receiving device and a transmitting device with a communications range supported by each of the RCMs of the receiving device, or historical and usage information of the receiving device.

The wake-up transmitter may be implemented using an orthogonal frequency division multiplexing (OFDM) transmitter with minor modifications. Therefore, any RCM that supports OFDM can support transmitting a wake-up signal.

Figure 1:
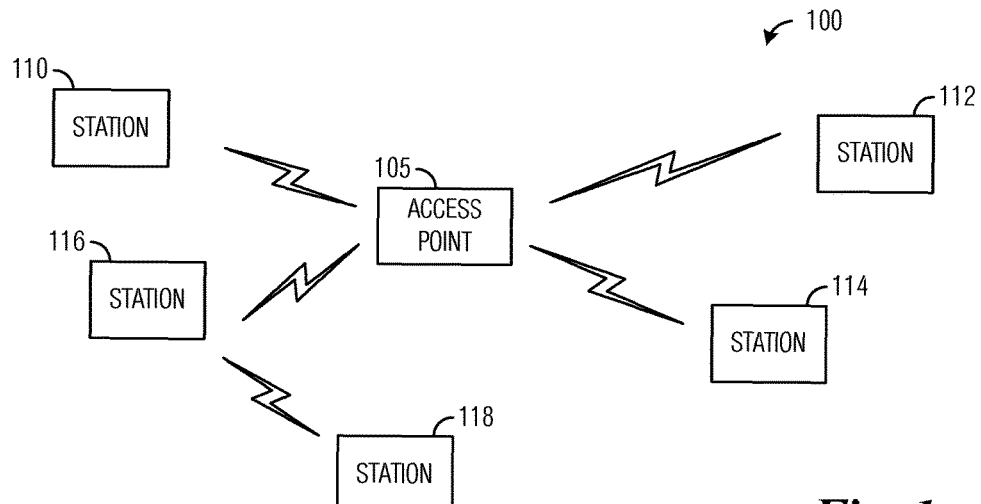
FIG. 1 is an example communications system.

FIG. 1 shows an example communications system 100. Communications system 100 includes an access point (AP) 105 that is serving a plurality of stations, such as stations 110, 112, 114, 116, and 118. In a first operating mode, commonly referred to as infrastructure-based communications mode or Wireless LAN (WLAN) mode, access point 105 controls certain aspects (such as such as radio frequency channel, transmission power limit, authentication, security, etc.) of communications with or among its associated stations. Generally speaking, in communications system 100, wireless resources for both uplink (station to access point) and downlink (access point to station) transmissions are accessed by transmitters based on a distributed contention mechanism commonly referred to as carrier sensing multiple access with collision avoidance (CSMA/CA). However, access point 105 still may influence the resource allocation by assigning different access priorities to stations and/or traffic types, and when succeeding in channel contention, by explicitly allocating certain time periods for certain stations and/or traffics or for special purposes, such as Quiet Period during which time no transmitter may transmit.

In a second operating mode, commonly referred to as a direct communications mode, ad-hoc mode, or peer-to-peer mode, stations (such as station 116 and station 118) act as peer stations and may communicate directly with one another without going through a centralized entity such as access point 105. Examples of such direct communications include Wi-Fi Direct and neighbor awareness networking (NAN) compliant communications systems, both of which are specified by the Wi-Fi Alliance based on the IEEE 802.11 Standards.

While it is understood that communications systems may employ multiple access points capable of communicating with a number of UEs, only one access point and five stations are illustrated for simplicity.

Figure 2:
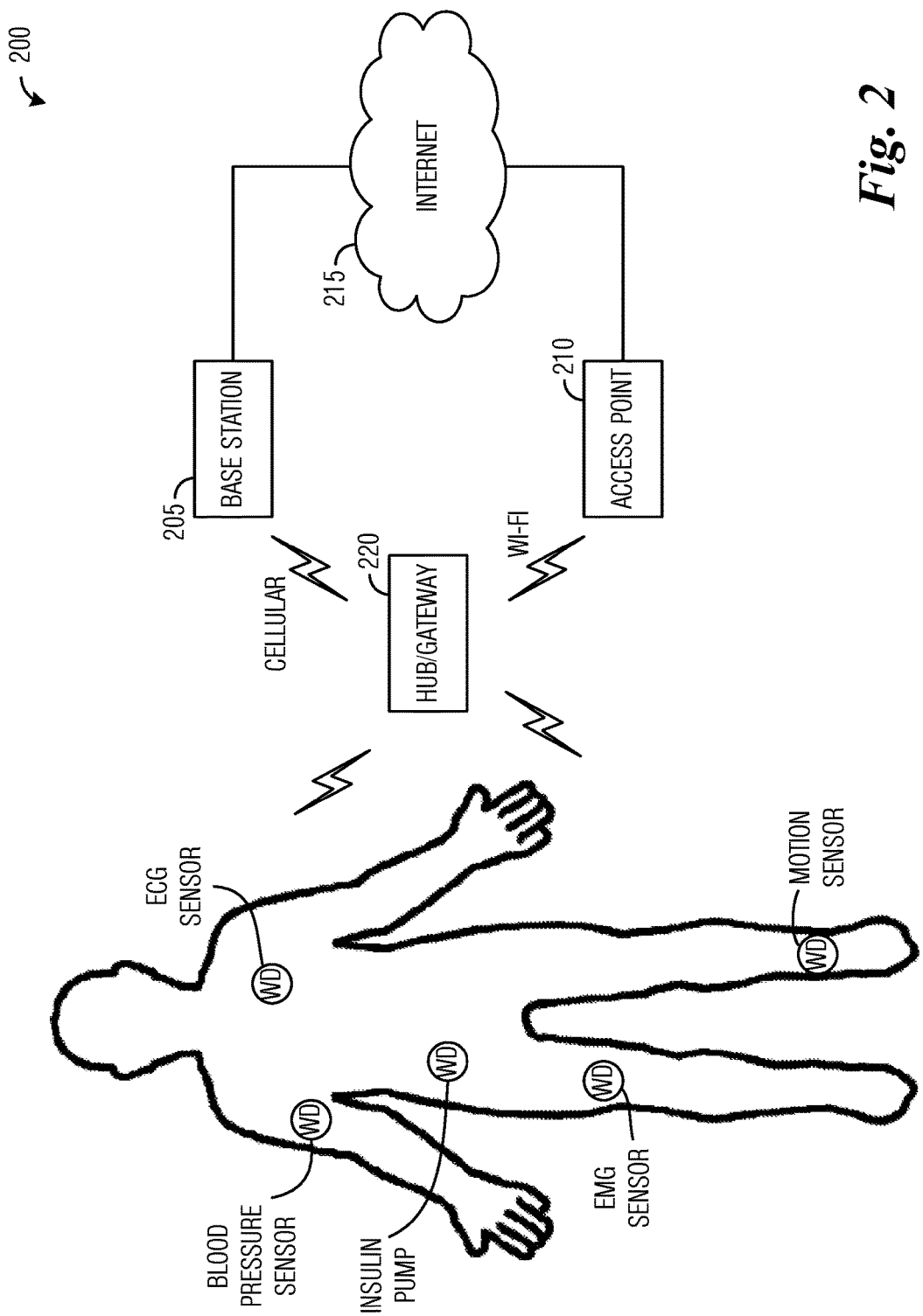
FIG. 2 is an example communications system highlighting wearable devices according to example embodiments described herein.

FIG. 2 illustrates an example communications system 200 highlighting wearable devices (WDs). Communications system 200 includes a base station 205 and/or an access point 210 connected to the Internet 215. The connection between the Internet 215 and base station 205 or access point 210 is typically based on wire-line networks over twisted pair, coaxial cable, and/or optical fiber, etc. Communications system 200 also includes a hub device (or gateway device) 220 that is also connected to the Internet 215 through either or both base station 205 and access point 210.

The connection between hub device 220 and base station 205 is typically based on a public land mobile network (PLMN) using a cellular radio technology such as a Third Generation Partnership Project (3GPP) High Speed Packet Access (HSPA) or Long Term Evolution (LTE), Global System for Mobile Communication (GSM), and so on, and is typically used when hub device 220 is disconnected from a local area network (LAN), such as one installed at the user's home or office. In such a case, hub device 220 may usually be a smartphone or a radio device installed in a car, bus, train, light rail, airplane, and so on. The connection between hub device 220 and access point 210 is normally based on a local area network either using a short range radio technology (such as IEEE 802.11, Bluetooth, or IEEE 802.15.4) or using a wire-line technology (for example, over twisted pair, cable, or power line), and is generally used when hub device 220 is connected with a LAN, such as one installed at the user's home or office. In such a situation, hub device 220 may typically be a smartphone or a device either co-located or connected (e.g., using power line, twisted pair, cable, or a short-range radio such as IEEE 802.11, Bluetooth, and IEEE 802.15.4) with access point 210.

Communications system 200 also includes WDs, such as personal health devices (such as ECG sensor, blood pressure sensor, insulin pump, EMG sensor, and so on), activity monitor devices (such as motion sensors, heart rate sensors, body temperature sensors, and so on), information gadgets (such as smart watches, portable video players, portable music players, and so on), etc. Hub device 220 provides connectivity for WDs, typically by using a short range radio technology such as IEEE 802.11, Bluetooth, and IEEE 802.15.4. Alternatively, hub device 220 may be dedicated devices deployed at high density locations to enable WDs to connect to the Internet 215. In such a situation, hub device 220 may be deployed by a home owner, an entity responsible for providing connectivity at the high density location, an operator of a communications system, a provider providing connectivity for pay, a communications system subscriber interested in providing connectivity for credits or discounts, or so on.

Many wearable devices, sensors, and Internet of Things (IoT) devices operate on battery power. Therefore, it is desired that the RCMs on these devices have low power consumption.

FIG. 3 illustrates an example IEEE 802.11 communications system 300 with a low-power wake-up radio (LP-WUR). Communications system 300 includes a transmitting device 305 and a receiving device 310. Transmitting device 305 includes, among other things, an enhanced 802.11 RCM (labeled "802.11+") 307. Enhanced 802.11 RCM 307 is capable of communications utilizing IEEE 802.11 standard signaling, as well as LP-WUR signaling, including the transmission of a wake-up packet. At least a payload portion of the wake-up packet may be transmitted over a much narrower channel bandwidth than the IEEE 802.11 standard signaling. For example, IEEE 802.11 standard signaling may be transmitted over a channel bandwidth of 20 MHz and the payload of the wake-up packet may be transmitted over a channel bandwidth of 5 MHz or less. A narrower bandwidth helps to reduce the cost and power consumption of an intended receiver, such as one in receiving device 310, which is very desirable for designing a LP-WUR.

Receiving device 310 includes, among other things, an 802.11 RCM 312 and a LP-WUR 314. 802.11 RCM 312 is intended for communicating user data while LP-WUR 314 is not. Thus, LP-WUR 314 usually does not have a transmitter. LP-WUR 314 is present to assist in waking up 802.11 RCM 312 from a sleeping or OFF mode. In general, LP-WUR 314 is ON when 802.11 RCM 312 is OFF (e.g., in the sleeping mode). LP-WUR 314 comprises a memory (or register) designed to store a value provided by a processor associated with 802.11 RCM 312, a receiver designed to receive at least the payload of the wake-up packet, and a comparator designed to compare a value in the received payload with the value stored in the memory. The comparator generates a signal referred to as a wake-up interrupt when the received value matches with the stored value. LP-WUR 314 is coupled to 802.11 RCM 312 through a connection used for carrying the wake-up interrupt, which may be used by LP-WUR 314 to wake up 802.11 RCM 312 from the sleeping mode. In computer science, an interrupt is a term used for a signal external to a processor that alerts the processor to a high-priority condition or event requiring the interruption of the current program the processor is executing. The processor responds by suspending its current activities and executing programs to deal with the event. The interruption may be temporary, and, after the execution of programs dealing with the event finishes, the processor may resume its current activities. For example, when there is no data communications for a while or when a sleep command is received, a processor associated with 802.11 RCM 312 may execute a program that places at least a major portion of the electronic circuits inside 802.11 RCM 312 into a sleeping mode, which may also be referred to as a power save mode or a power off mode. While the portion of the electronic circuits of 802.11 RCM 312 is in the sleeping mode, the capabilities of 802.11 RCM 312 is disabled to the extent that the 802.11 RCM 312 is no longer capable of communications utilizing IEEE 802.11 standard signaling. The processor associated with 802.11 RCM 312 responds to the wake-up interrupt generated by LP-WUR 314 by powering up the electronic circuits inside 802.11 RCM 312 thereby resuming its capability to communicate utilizing IEEE 802.11 standard signaling. In general, when in the ON or active state, 802.11 RCM 312 will consume significantly greater power than LP-WUR 314, at least one or two orders of magnitude more power. An example target power consumption for LP-WUR 314 is less than 100 micro-watts while ON. The receiver of LP-WUR 314 has a narrow bandwidth matching the bandwidth of the payload of the wake-up packet, 5 MHz or less than, for example, and has a reception range that is approximately equal to that of 802.11 RCMs.

When performing 802.11 communications, transmitting device 305 transmits data packets, such as data packet 320, to receiving device 310, where 802.11 RCM 312 receives and processes the data packet.

As shown in FIG. 3, receiving device 310 initially is in a reduced power state. One of the ways that receiving device 310 is able to reduce power consumption is to turn OFF 802.11 RCM 312 while keeping LP-WUR 314 ON. When receiving device 310 is in the reduced power state, 802.11 RCM 312 is OFF and receiving device 310 is unable to receive or process 802.11 data packets.

However, LP-WUR 314 remains ON and receiving device 310 is able to receive wake-up packets, such as wake-up packet 325. In a situation where transmitting device 305 has data to transmit to receiving device 310, but receiving device 310 is in the reduced power state, transmitting device 305 first transmits a wake-up packet 325 to receiving device 310, e.g., using 802.11+ RCM 307. Wake-up packet 325 is received and processed by LP-WUR 314, which wakes up 802.11 RCM 312. Then, transmitting device 305 transmits data to receiving device 310 using 802.11+ RCM 307 and receiving device 310 receives the data using 802.11 RCM 312.

Highlight 330 provides a detailed view of an example wake-up packet, e.g., wake-up packet 325. The wake-up packet includes a preamble 332 and a payload 334. In order to maintain compatibility with 802.11 compliant devices in communications system 300, preamble 332 is an 802.11 legacy preamble transmitted over a channel bandwidth complaint with 802.11 standard signaling, such as 20 MHz. Preamble 332 is not to be detected by the LP-WUR, such as LP-WUR 314, because the receiver bandwidth of LP-WUR is usually insufficient to receive 802.11 legacy preambles, such as preamble 332. Instead, preamble 332 is intended for legacy 802.11 devices to prevent them from transmitting during the transmission of payload 334. A LENGTH subfield of a Legacy SIGNAL field (L-SIG) in preamble 332 is used to indicate the duration of payload 334. Payload 334 includes information that is modulated using a simple modulation scheme, such as On-Off-Keying (OOK) and is transmitting over a narrower channel bandwidth, such as 5 MHz or less. Therefore, legacy 802.11 devices normally won't be able to detect payload 334. However, legacy 802.11 devices are capable of detecting preamble 332 because preamble 332 fully complies with the bandwidth and signal format of legacy 802.11 standards. Thus, when receiving preamble 332, legacy 802.11 devices recognize that the channel will be busy for at least a duration indicated by the LENGTH value and thereafter suspend their attempts of transmitting during the transmission of payload 334, as if payload 334 complied with IEEE 802.11 standard signaling. It is noted that OOK modulation may be implemented using an OFDM transmitter with relatively minor modification, for example, enhanced 802.11 RCM 307 is not only capable of OFDM modulated communications but also capable of transmitting signals that comply with OOK modulated waveform.

FIG. 4A illustrates a detailed view of an example wake-up packet 400. Wake-up packet 400 includes a preamble 405 and a payload 410. Preamble 405 is compliant to 802.11 technical standards and includes a Legacy short training field (L-STF) 406, a Legacy long training field (L-LTF) 407, and L-SIG 408. Payload 410 includes multiple fields, including a wake-up preamble 411, a medium access control (MAC) header (e.g., a receiver address) 412, a frame body 413, and a frame check sequence (FCS) 414. Wake-up preamble 411 contains a wake-up sequence. The wake-up sequence may be a pseudo-random number sequence, for example, possessing good auto-correlation properties in order to assist LP-WURs to acquire timing for sampling and detecting the remainder of payload 410. MAC header 412 contains the address of a receiving device wake-up packet 400 is intended to wake up. The address of the receiving device may also be referred to as the identifier of the receiving device. Frame body 413 may contain other information. FCS 414 includes a cyclic-redundancy check (CRC) for integrity checking wake-up packet 400.

FIG. 4B illustrates an example wake-up packet 450. As shown in FIG. 4B, each bit is equal to an OFDM symbol period, which is 4 microseconds, for a total data rate of 250 kbps.

Many modern day devices have a plurality of RCMs, where each radio may have different coverage and/or different data rates, for example. As an illustrative example, some devices have multiple 802.11 RCMs (or at least multiple radio frequency (RF) front ends), each operating at different frequency bands (such as 2.4 GHz, 5 GHz, 60 GHz, and sub-1 GHz), having different coverage or supporting different ranges of data rates. As another illustrative example, some devices may be equipped with a plurality of RCMs for different radio access technologies (RATs), such as 802.11, Bluetooth, 802.15.4/ZigBee, 3GPP LTE, License Assisted Access (LAA), MuLTEFire, and so on. Different RATs may be used under different circumstances, e.g., Bluetooth has a smaller coverage area, lower data rates, and a lower power consumption when fully waked up; on the other hand 802.11 has a larger coverage area, higher data rates, and a higher power consumption when fully waked up.

When there is no activity on a RCM, the RCM can turn OFF, resulting in reduced power consumption. The more RCMs that are able to turn OFF, the greater the reduction in power consumption. However, having multiple LP-WURs (one for each RCM, for example) that are ON results in unnecessary power consumption. Furthermore, complexity is added to the implementation of the transmitting and the receiving devices.

Figure 5:
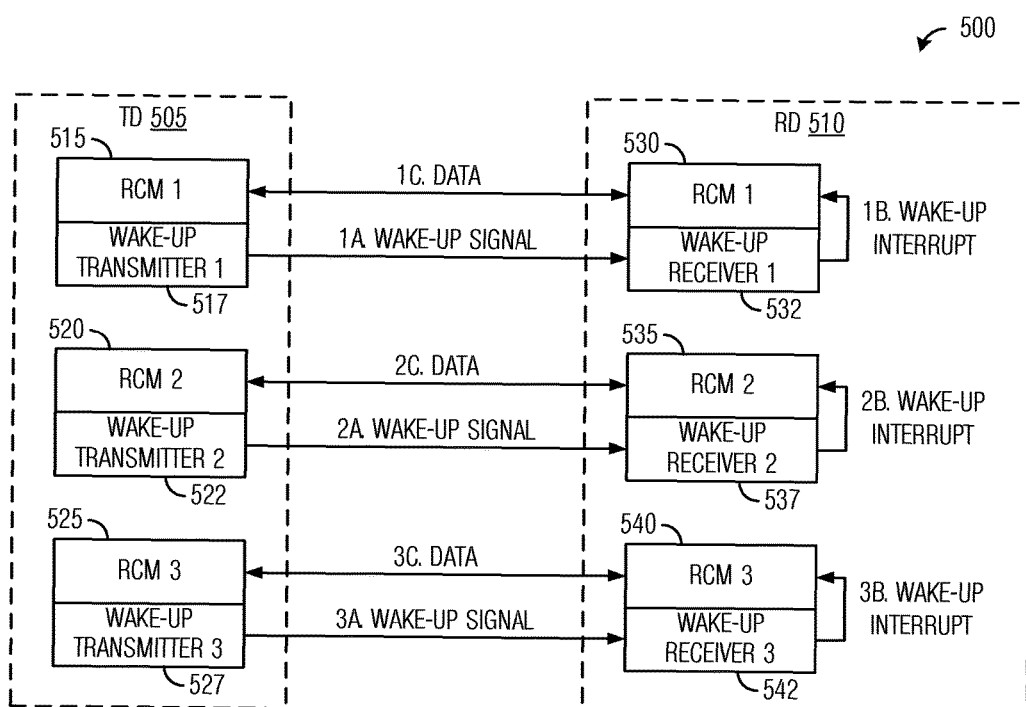
FIG. 5 illustrates an example communications system highlighting LP-WU radios at both transmitting and receiving devices according to example embodiments described herein.

FIG. 5 illustrates an example communications system 500 highlighting LP-WU radios at both transmitting and receiving devices. Communications system 500 includes a transmitting device (TD) 505 and a receiving device (RD) 510. As an example, a TD may be an access point (AP) and a RD may be a station when a pending data is in a downlink transmission, while when a pending data is in an uplink transmission, a TD may be a station and a RD may be an AP. Alternatively, a TD may be a peer station communicating with a RD using peer-to-peer communications. As shown in FIG. 5, TD 505 includes three RCMs, such as RCMs 515, 520, and 525. Each of the three RCMs includes a wake-up transmitter, such as wake-up transmitters 517, 522, and 527, respectively. When TD 505 has a transmission for RD 510 on a particular RAT, TD 505 first transmits a wake-up signal (in the form of a wake-up packet) using a wake-up transmitter associated with a RCM of the RAT and then transmits one or more data packets to RD 510 using the RCM of the RAT. As an illustrative example, if TD 505 has a transmission for RD 510 on a RAT associated with RCM 520, TD 505 transmits a wake-up signal addressed to RD 510 using wake-up transmitter 522 and then transmits one or more data packets to RD 510 using RCM 520. The configuration of RD 505 and TD 510 requires that different wake-up transmitters and wake-up receivers be used for each RCM pair. Hence, implementation of the wake-up process may be unnecessarily complex.

According to an example embodiment, a system and method for waking up one or more RCMs out of a plurality of RCMs of a device are presented. The system and method discussed herein provide a first device (e.g., a RD) with an auxiliary radio receiver (a wake-up receiver), where the wake-up receiver, upon receiving a corresponding wake-up signal from a second device (e.g., a TD), wakes up a first RCM out of a plurality of RCMs of the first device in order for the first device to communicate with the second device using the first RCM. The plurality of RCMs include at least one of an 802.11 (Wi-Fi) module, a Bluetooth module, an 802.15.4 (ZigBee) module, a 3GPP LTE module, an LAA module, or a MuLTEFire module. The plurality of RCMs operate in at least one of 2.4 GHz, 5 GHz, 60 GHz, sub-1 MHz, 3.5 GHz, 2 GHz, and 1.8 GHz frequency bands. The wake-up receiver, while active or ON, consumes significantly less power than any one of the plurality of RCMs.

According to an example embodiment, a determination regarding which one of the plurality of RCMs to wake is made by the TD, which also wakes up the RD. The TD indicates to the RD which of the plurality of RCMs of the RD to wake up. The TD may be an AP serving the RD or a peer station communicating with the RD. The determination regarding which one of the plurality of RCMs to wake may be made by one of a plurality of RCMs of the TD or a processor of the TD. The determination may be made based on a determination criterion, such as a power consumption requirement (as compared to the power consumption of each RCM of the RD if woken up), a latency requirement (as compared to the latency associated with waking up each RCM of the RD), a QoS requirement of an anticipated data transmission (as compared to the QoS supported by each of the RCMs of the RD), a range requirement (e.g., wherein an estimated range between the TD and the RD is compared to the communications range supported by each RCM of the RD if woken up), a source of data arrived at the TD and targeted for the RD (e.g., whether the date comes from an LTE core network or a local area network (LAN)), historical and usage information, and so on.

According to an example embodiment, the TD explicitly indicates the RCM of the RD to wake up in the wake-up signal. The TD may use different wake-up preambles or addresses in the wake-up signals to indicate which one of the plurality of RCMs of the RD to wake up. The TD may use an indication field in the wake-up signal as an indication of which one of the plurality of RCMs of the RD to wake up. For example, the indication field may be placed within a frame body, such as frame body 413, of the wake-up signal. Table 1 illustrates an example mapping of values of indication bits to corresponding RCMs. The mapping of values of indication bits to their corresponding RCMs may be standardized (as shown in Table 1, for example), so that the RD may use the received indication bits and the standardized mapping to determine which RCM of the RD is to be woken up. However, due to the availability of many different RATs combined with different frequency bands, a large number of indication bits may be needed.

TABLE 1

Example mapping of values of indication bits to RCMs.

| Indication Bits | Corresponding RCM |
| --- | --- |
| 000 | Bluetooth 2.4 GHz |
| 001 | Wi-Fi 2.4 GHz |
| 010 | Wi-Fi 5 GHz |
| 011 | 3GPP LTE 900 MHz |
| 100 | 3GPP LTE 2 GHz |
| ... | ... |

According to an alternative example embodiment, the TD and the RD negotiate and/or configure the mapping between values of indication bits to corresponding RCMs. The TD and the RD may negotiate and/or configure the mapping between the values of the indication bits to corresponding RCMs prior to sending the wake-up signal, utilizing communications between one of the plurality of RCMs available to the TD and the RD, for example, during an association procedure or a configuration procedure between the TD and the RD. Therefore, the mapping between values of indication bits and their corresponding RCMs is pair-specific (among TD-RD pairs), in which case, a small number of indication bits may be sufficient. The TD-RD pair-specific mapping can be illustrated as a table with one-to-one mapping between a value of the indication bits and a corresponding RCM of the RD. Because the mapping is TD-RD pair-specific, the TD may provide pair-specific mapping information to each of the RDs that the TD is serving, in a mapping field included in a configuration message communicated between the TD and the each of the RD, for example, during an association procedure or a configuration procedure between the TD and the each of the RDs. After the RD of the specific TD-RD pair receives its wake-up signal, it uses the received indication bits included in the wake-up signal and the TD-RD pair-specific mapping information to determine which RCM of the RD is to be woken up.

Alternatively, the mapping may be illustrated as a two-step mapping using multiple tables, such as the following two tables. A first table, e.g., Table 2, illustrates an example mapping of values of indication bits (mapping indicator) to corresponding RCM indices, which mapping may be standardized so that all TD-RD pairs follow the same mapping illustrated in the first table. In other words, the first table provides the mapping of the mapping indicator values to RCM indices. A second table, e.g., Table 3, illustrates an example preconfigured mapping of RCM indices to corresponding RCMs, which mapping is pre-configured between a specific TD-RD pair using their respective RCMs. In this situation, after the RD of the specific TD-RD pair receives its wake-up signal, the RD uses the received indication bits and the mapping in Tables 2 and 3 together to determine which RCM of the RD is to be woken up. As an illustrative example, if the received indication bit indicates value '1', then the RD will use the first table to determine that it is wake up RCM 2, which is the RCM for Wi-Fi 2.4 GHz, as indicated in the second table.

TABLE 2

Example mapping of values of indication bits to RCM indices.

| Indication Bit | Corresponding RCM index |
| --- | --- |
| 0 | RCM 1 |
| 1 | RCM 2 |

TABLE 3

Example preconfigured mapping of RCM indices to RCMs.

| RCM index | Corresponding RCM |
| --- | --- |
| RCM 1 | Bluetooth 2.4 GHz |
| RCM 2 | Wi-Fi 2.4 GHz |

Figure 6:
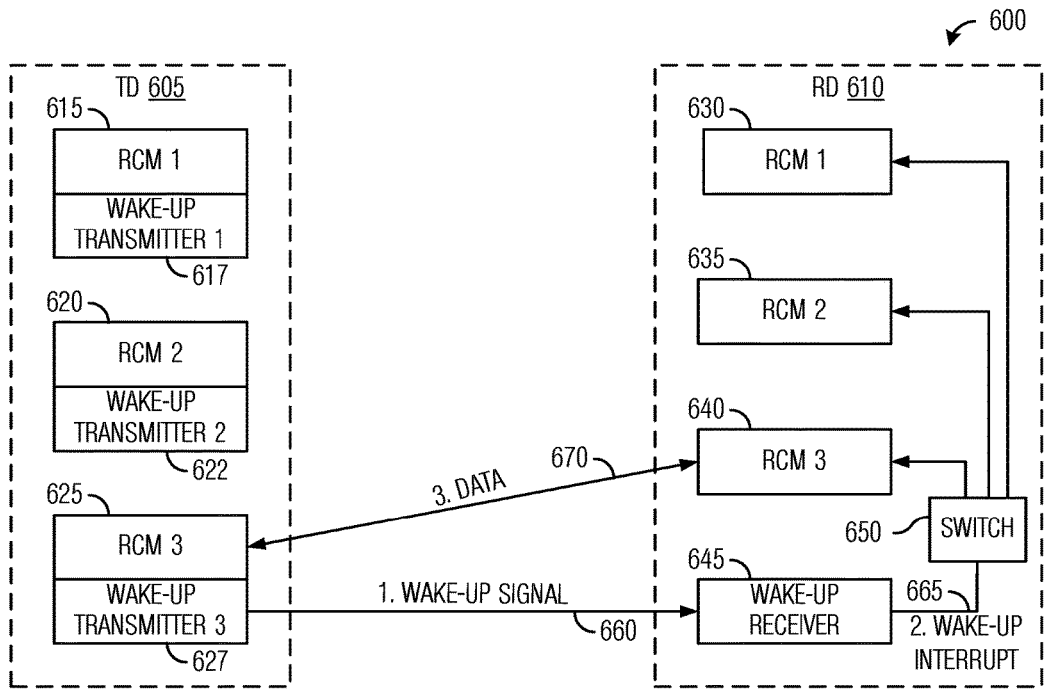
FIG. 6 illustrates a first example communications system highlighting the indication of a RCM to wake up in a wake-up signal according to example embodiments described herein.

FIG. 6 illustrates a first example communications system 600 highlighting the indication of a RCM to wake up in a wake-up signal. Communications system 600 includes a TD 605 and a RD 610. TD 605 includes a plurality of RCMs, including RCMs 615, 620, and 625. Each RCM includes a wake-up transmitter, including wake-up transmitters 617, 622, and 627, respectively. Each wake-up transmitter of wake-up transmitters 617, 622, and 627 may be implemented as a physically separate OOK transmitter that is distinct from the regular transmitter and receiver of each RCM of RCMs 615, 620, and 625 that are used for communications using OFDM modulated signals. Alternatively, as discussed previously, transmission of an OOK modulated wake-up signal can readily be implemented in any OFDM transmitter, so that a wake-up transmitter, such as wake-up transmitters 617, 622, and 627, may be merely a logical function that is implemented in every transmitter capable of transmitting OFDM modulated signals. Therefore, the inclusion of a wake-up transmitter in each RCM should not be construed as being limiting to either the scope or the spirit of the example embodiments. As shown in FIG. 6, TD 605 has a data to be sent to RD 610 when RD 610 is in the reduced power state. So, a processor in TD 605, such as a central processor of TD 605 or a processor of RCM 625 configures wake-up transmitter 627 to transmit a wake-up signal to RD 610 first (shown as event 660).

RD 610 includes a plurality of RCMs, including RCMs 630, 635, and 640. RD 610 also includes a wake-up receiver 645 and a switch 650. Switch 650 may be a logical entity and may be implemented as a part of wake-up receiver 645 or a part of a processor in RD 610. Alternatively, switch 650 may be a separate entity. Switch 650 is powered on when wake-up receiver 645 is powered on. Wake-up receiver 645 is capable of receiving and processing wake-up signals addressed to RD 610. When wake-up receiver 645 receives a wake-up signal and determines that the wake-up signal is intended for RD 610 (e.g., when an address (or identifier) in the received wake-up signal, such as a receiver address (or identifier) contained in MAC header 412, matches with an address (or identifier) assigned to RD 610), a wake-up interrupt is generated (shown as event 665) and further processing is performed (e.g., processing of indication bits in the wake-up signal in accordance with Table 1, the TD-RD pair-specific mapping table, or Tables 2-3, the multi-step mapping process, as described previously) to determine which RCM to wake up. In other words, the wake-up signal is intended for RD 610 when the address included in the wake-up signal is the same as the address of RD 610.

Wake-up receiver 645 configures switch 650 to assert the wake-up interrupt to wake-up the indicated RCM (e.g., RCM 640 as shown in FIG. 6). Switch 650 may be implemented as a hardware switch, such as a demultiplexor, or in software or as a combination of hardware and software. The wake-up interrupt may wake up RCM 640 by causing a central processor of RD 610 or a processor of RCM 640 to execute program for powering up RCM 640. Eventually RD 610 completes data exchanges with TD 605 (shown as event 670 in FIG. 6) using RCM 640, including receiving data from TD 605, and possibly including transmitting an acknowledgement, a response, or a follow-up message or data to TD 605. After the completion of data exchanges (event 670), RD 610 may determine that there is no further communications activities or RD 610 may receive a command to sleep from TD 605. Thereafter, RD 610 may resume the reduced power state by placing RCM 640 and associated processor back into a sleep mode while having wake-up receiver 645 and switch 650 switched back ON. RD 610 may have temporarily turned off wake-up receiver 645 and switch 650 when RCM 640 is turned ON, to save more power. It is noted that it is only necessary to have a single wake-up receiver, such as wake-up receiver 645, be powered on to wake up any of the RCMs in the plurality of RCMs, thereby simplifying implementation and further reducing power consumption.

Figure 7:
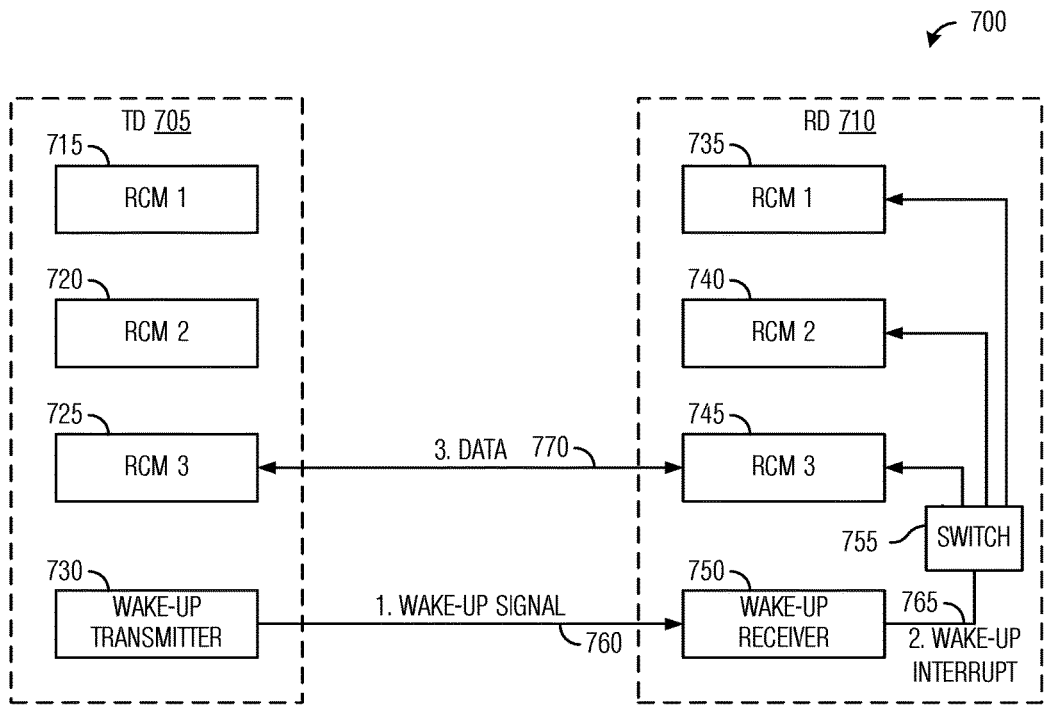
FIG. 7 illustrates a second example communications system highlighting the indication of a RCM to wake up in a wake-up signal according to example embodiments described herein.

FIG. 7 illustrates a second example communications system 700 highlighting the indication of a RCM to wake up in a wake-up signal. Communications system 700 includes a TD 705 and a RD 710. TD 705 includes a plurality of RCMs, including RCMs 715, 720, and 725. TD 705 also includes a wake-up transmitter 730. Wake-up transmitter 730 may be implemented as an individual radio in TD 705. Alternatively, wake-up transmitter 730 may be implemented as part of one of the RCMs of TD 705, for example, by utilizing the OFDM transmitter in one of the RCMs of TD 705 for transmitting the OOK modulated wake-up signal. When TD 705 needs to transmit a data to RD 710 while RD 710 is in the reduced power state, TD 705 configures wake-up transmitter 730 to transmit a wake-up signal to RD 710 first (shown as event 760 in FIG. 7). RD 710 includes a plurality of RCMs, including RCMs 735, 740, and 745. RD 710 also includes a wake-up receiver 750 and a switch 755. Wake-up receiver 750 is capable of receiving and processing wake-up signals addressed to RD 710. When wake-up receiver 750 receives a wake-up signal and determines that the wake-up signal is intended for RD 710 (by determining that an address included in the wake-up signal is equal to the address of RD 710, for example), a wake-up interrupt is generated (shown as event 765 in FIG. 7) and further processing is performed (e.g., processing of indication bits in the wake-up signal in accordance with Table 1, the TD-RD pair-specific mapping table, or Tables 2-3, the multi-step mapping process, as described previously) to determine which RCM to wake up. Wake-up receiver 750 configures switch 755 to assert the wake-up interrupt to wake-up the indicated RCM (e.g., RCM 745 as shown in FIG. 7). After waking up RCM 745, RD 710 may complete data exchanges with TD 705 (shown as event 770 in FIG. 7) using RCM 745. Eventually, RD 710 may resume the reduced power state by placing RCM 745 and associated processor back into a sleep mode while having wake-up receiver 750 and switch 755 switched back ON. It is noted that it is only necessary to have a single wake-up receiver, such as wake-up receiver 750, be powered on to wake up any of the RCMs in the plurality of RCMs.

According to an example embodiment, the TD and the RD, prior to the transmission and reception of a wake-up signal, for example, during a current wake-up event (i.e., while an RCM of the RD is awake), configure which RCM to wake up in a future event of receiving the wake-up signal. Such pre-configuration eliminates the need for explicitly indicating, e.g., in the wake-up signal, which RCM to wake up. For example, the indication bit(s) field, as described in Tables 1 and 2 may be eliminated from the wake-up signal and may be included in a configuration message between the TD and the RD prior to the transmission and reception of the wake-up signal. The TD and the RD configure which RCM to wake up using communications between any pair of the RCMs available at the TD and the RD, while the RCM at the RD is ON, for example, during a wake-up event (i.e., during an event where the RCM is woken up). Because an OOK modulated signal is very vulnerable to noise and interference, removing the indication bit(s) field from the wake-up signal helps to reduce error probability in detecting the wake-up signal. And because communications between RCMs use advanced modulation and coding scheme (MCS) and an explicit acknowledgement may be solicited to confirm the reception of the configuration message, including the indication field in the configuration message results in a more reliable way of indicating which RCM to wake up in event of receiving a matching wake-up signal. Moving the indication bit(s) field from the wake-up signals to a configuration message using communications between the RCMs also helps to reduce the signaling overhead, because the wake-up signals are transmitted both more frequently and at a lower data rate than the configuration message using communications between the RCMs. The configuration may be stored in a memory in the RD, such as in a memory of the wake-up receiver of the RD, and is used to configure the switch for forwarding the wake-up interrupt.

Figure 8:
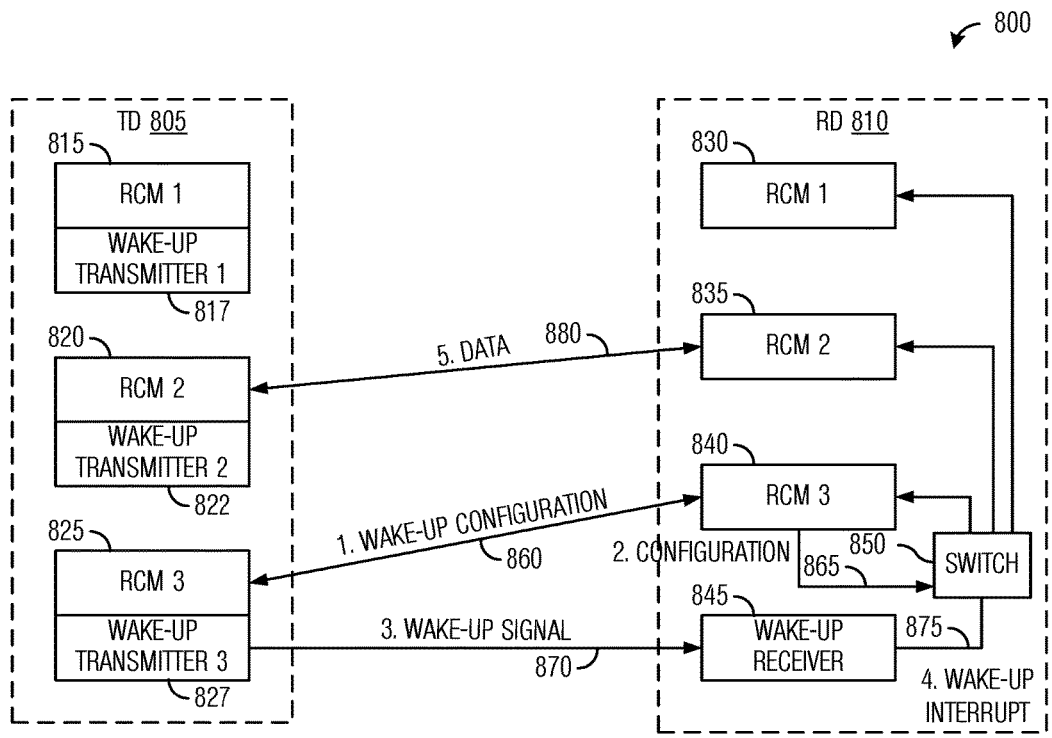
FIG. 8 illustrates a first example communications system highlighting the configuration of a RCM to wake up in event of a reception of a wake-up signal according to example embodiments described herein.

FIG. 8 illustrates a first example communications system 800 highlighting the configuration of a RCM to wake up in event of a reception of a wake-up signal. Communications system 800 includes a TD 805 and a RD 810. TD 805 includes a plurality of RCMs, including RCMs 815, 820, and 825. Each RCM includes a wake-up transmitter, including wake-up transmitters 817, 822, and 827. Each of wake-up transmitters 817, 822, and 827 may be implemented as a physically separate OOK transmitter that is distinct from the regular transmitter and receiver of each RCM of RCMs 815, 820, and 825 that are used for communications using OFDM modulated signals. Alternatively, each of wake-up transmitters 817, 822, and 827 may be merely a logical function that is implemented in each regular transmitter capable of transmitting OFDM modulated signals in RCMs 815, 820, and 825. Therefore, the inclusion of a wake-up transmitter in each RCM should not be construed as being limiting to either the scope or the spirit of the example embodiments. RD 810 includes a plurality of RCMs, including RCMs 830, 835, and 840. RD 810 also includes a wake-up receiver 845 and a switch 850.

TD 805 and RD 810 communicate using RCMs, such as RCM 825 and RCM 840 to configure a RCM to wake up in event of a reception of a matching wake-up signal (shown as event 860). The configuration may be the result of a negotiation between TD 805 and RD 810. The configuration causes switch 850 to be configured to assert the wake-up interrupt to wake-up the configured RCM (shown as even 865). As an illustrative example, RCM 835 is configured to wake up in event of a reception of a wake-up signal. Any of the RCMs of RD 810 may be configured to be the RCM to wake up, as long as the configured RCM is compatible with one of the RCMs of TD 85. After the configuration is complete, RD 810 may enter a reduced power state by placing RCMs 830, 835, and 840 into a sleeping mode and having wake-up receiver 845 and switch 850 powered ON. At a later time, TD 805 transmits a wake-up signal to RD 810 (shown as event 870), and wake-up receiver 845 determines that the wake-up signal is intended for RD 810 (by determining that an address included in the wake-up signal is equal to the address of RD 810, for example) and generates the wake-up interrupt (shown as event 875). The wake-up interrupt is forwarded to the configured RCM (RCM 835 in this example) to wake up the configured RCM. After waking up RCM 835, RD 810 may complete data exchanges with TD 805 (shown as event 880) using RCM 835. Eventually, RD 810 may resume the reduced power state by placing RCM 835 and associated processor back into the sleeping mode while having wake-up receiver 845 and switch 850 switched back ON. It is noted that it is only necessary to have a single wake-up receiver, such as wake-up receiver 845, be powered on to wake up any of the RCMs in the plurality of RCMs.

Figure 9:
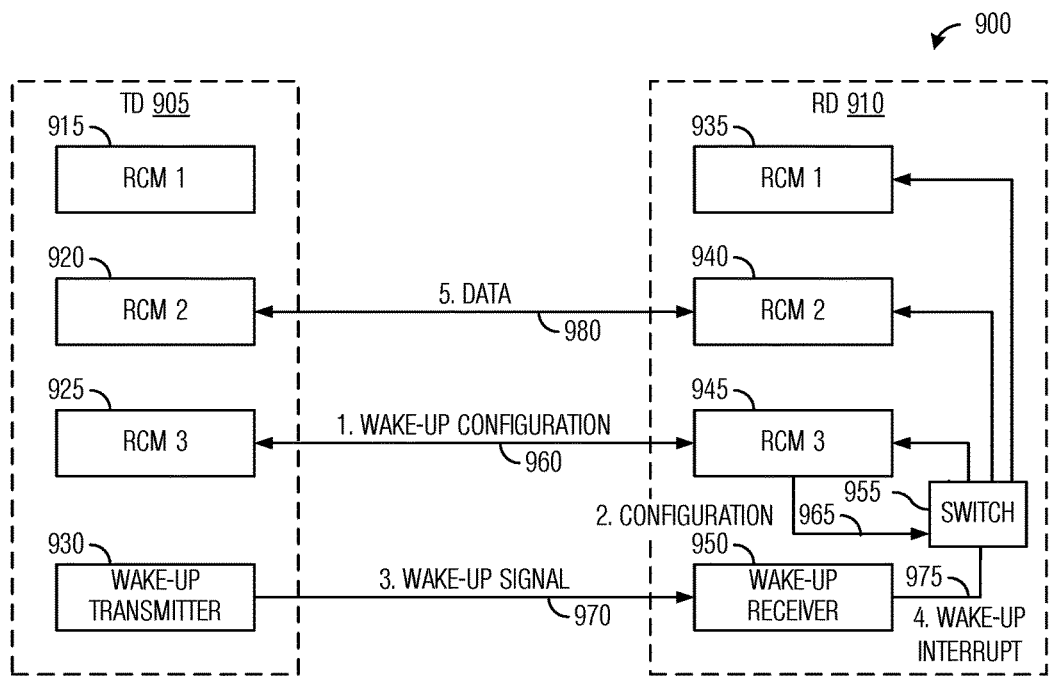
FIG. 9 illustrates a second example communications system highlighting the configuration of a RCM to wake up in event of a reception of a wake-up signal according to example embodiments described herein.

FIG. 9 illustrates a second example communications system 900 highlighting the configuration of a RCM to wake up in event of a reception of a wake-up signal. Communications system 900 includes a TD 905 and a RD 910. TD 905 includes a plurality of RCMs, including RCMs 915, 920, and 925. TD 905 also includes a wake-up transmitter 930. Wake-up transmitter 930 may be implemented as an individual radio in TD 905. Alternatively, wake-up transmitter 930 may be implemented as part of one of the RCMs of TD 905, for example, by utilizing the OFDM transmitter in one of the RCMs of TD 905 for transmitting the OOK modulated wake-up signal. RD 910 includes a plurality of RCMs, including RCMs 935, 940, and 945. RD 910 also includes a wake-up receiver 950 and a switch 955. Wake-up receiver 950 is capable of receiving and processing wake-up signals addressed to RD 910.

TD 905 and RD 910 communicate using RCMs, such as RCM 925 and RCM 945 to configure a RCM to wake up in event of a reception of a matching wake-up signal (shown as event 960). The configuration causes switch 950 to be configured to assert the wake-up interrupt to wake-up the configured RCM (shown as even 965). As an illustrative example, RCM 940 is configured to wake up in event of a reception of a wake-up signal. Any of the RCMs of RD 910 may be configured to be the RCM to wake up, as long as the configured RCM is compatible with one of the RCMs of TD 905. After the configuration is complete, RD 910 may enter a reduced power state by placing RCMs 935, 940, and 945 into a sleeping mode and having wake-up receiver 950 and switch 955 powered ON. At a later time, TD 905 transmits a wake-up signal to RD 910 (shown as event 970), and wake-up receiver 950 determines that the wake-up signal is intended for RD 910 (by determining that an address included in the wake-up signal is equal to the address of RD 910, for example) and generates the wake-up interrupt (shown as event 975). The wake-up interrupt is forwarded to the configured RCM (RCM 940 in this example) to wake up the configured RCM. After waking up RCM 940, RD 910 may complete data exchanges with TD 905 (shown as event 980) using RCM 940. Eventually, RD 910 may resume the reduced power state by placing RCM 940 and associated processor back into a deep sleep mode while having wake-up receiver 950 and switch 955 switched back ON. It is noted that it is only necessary to have a single wake-up receiver, such as wake-up receiver 950, be powered on to wake up any of the RCMs in the plurality of RCMs.

According to an example embodiment, a determination regarding which one of the plurality of RCMs to wake is made by the RD. The determination may be made by one of the plurality of RCMs. Alternatively, a processor of the RD may make the determination. The determination may be made based on a determination criterion, such as a power consumption requirement (as compared to the power consumption of each RCM of the RD if woken up), a latency requirement (as compared to the latency associated with waking up each RCM of the RD), a QoS requirement of an anticipated data transmission (as compared to the QoS supported by each of the RCMs of the RD), an estimated range between the TD and the RD (as compared to the communications range supported by each RCM of the RD if woken up), historical and usage information, and so on. For example, the RD may take a strategy emphasizing power saving, wherein the RD always first wakes up a first RCM with smaller coverage and lower power consumption when being active, such as a Bluetooth-based RCM, and tries to make a contact with the TD using the first RCM. When the first RCM fails to make a contact with the TD (e.g., unable to receive a response from the TD within a specific time), the RD wakes up a second RCM with greater coverage and higher power consumption when being active, such as a Wi-Fi-based RCM, and tries to make a contact with the TD using the second RCM, and so on until the RD can communicate with the TD successfully. The RD indicates to the TD which one of the RCMs has been awakened. The indication may be transmitted as a signal to the TD using the RCM that has been woken up after the RCM has been woken up, for example. It is assumed that the TD has an active RCM that is compatible with the RCM at the RD that has been woken up.

Figure 10:
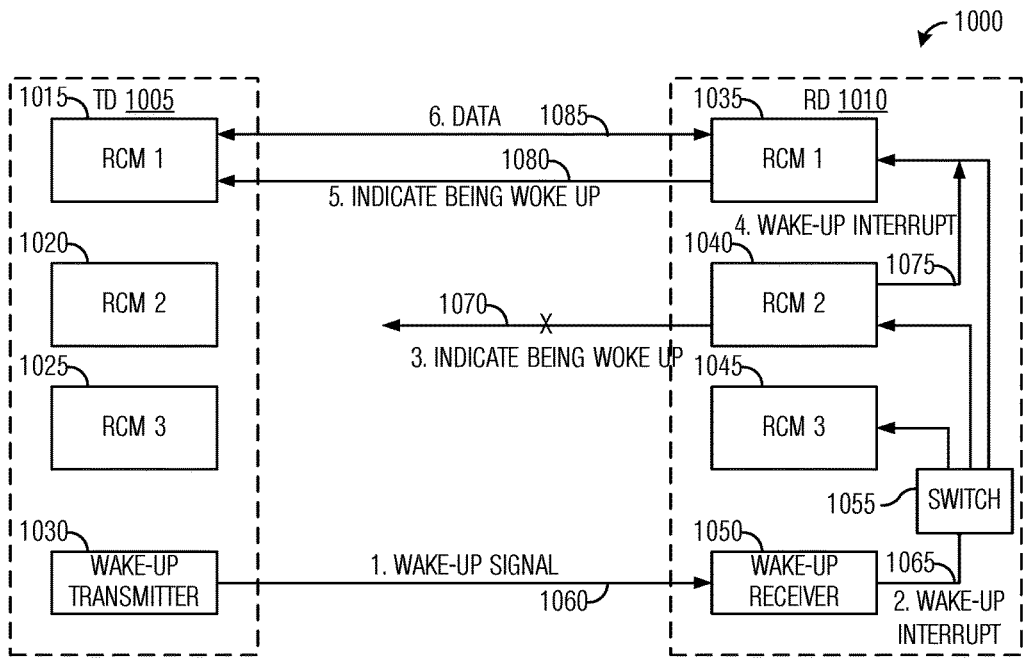
FIG. 10 illustrates an example communications system highlighting a RD determining which RCM to wake up according to example embodiments described herein.

FIG. 10 illustrates an example communications system 1000 highlighting a RD determining which RCM to wake up. Communications system 1000 includes a TD 1005 and a RD 1010. TD 1005 includes a plurality of RCMs, including RCMs 1015, 1020, and 1025. TD 1005 also includes a wake-up transmitter 1030. Wake-up transmitter 1030 may be implemented as an individual radio in TD 1005. Alternatively, wake-up transmitter 1030 may be implemented as part of one of the RCMs of TD 1005, for example, by utilizing the OFDM transmitter in one of the RCMs of TD 1005 for transmitting the OOK modulated wake-up signal. RD 1010 includes a plurality of RCMs, including RCMs 1035, 1040, and 1045. RD 1010 also includes a wake-up receiver 1050 and a switch 1055. Wake-up receiver 1050 is capable of receiving and processing wake-up signals addressed to RD 1010.

RD 1010 initially is in a reduced power state with RCMs 1035, 1040, and 1045 OFF and wake-up receiver 1050 and switch 1055 powered ON. TD 1005 transmits a wake-up signal to RD 1010 (shown as event 1060). Wake-up receiver 1050 receives and processes the wake-up signal and verifies that the wake-up signal is intended for RD 1010 (e.g., when an address in the received wake-up signal, such as a receiver address in MAC header 412, matches (or is equal to) an address assigned to RD 1010). Then, wake-up receiver generates a wake-up interrupt (shown as event 1065). RD 1010 determines which RCM to wake up. Switch 1055 may be a logic function performed by a processor of RD 1010 for asserting the wake-up interrupt to wake up the RCM that RD 1010 determines to wake up. As shown in FIG. 10, RD 1010 wakes up RCM 1040, which may best met the determination criterion of RD 1010. RD 1010 transmits an indication that RCM 1040 has been woken up to TD 1005 using RCM 1040 (shown as event 1070). However, RD 1010 does not receive a response from TD 1005 (the response may be a data transmission from TD 1005 or a specific response message from TD 1005). As an illustrative example, RCM 1040 may be a radio module for a short range RAT, such as Bluetooth, ZigBee, and so on, and a transmission using RCM 1040 is incapable of reaching TD 1005. Therefore, RD 1010 may select a RCM with greater coverage. Because no response from TD 1005 has been received (after a time-out, for example) another RCM (RCM 1035) is woken up (shown as event 1075). As an example, RCM 1040 may wake up RCM 1035, as shown in FIG. 10. As another example, a processor of RD 1010 may wake up RCM 1035 after receiving an indication of failure or timeout from RCM 1040. RD 1010 transmits an indication that RCM 1035 has been woken up to TD 1005 using RCM 1035 (shown as event 1080). In this instance, RD 1010 does receive a response from TD 1005 in the form of a data transmission (shown as event 1085). It is noted that it is only necessary to have a single wake-up receiver, such as wake-up receiver 1050, be powered on to wake up any of the RCMs in the plurality of RCMs.

According to an embodiment, the TD redirects the RD to switch to a preferred RAT if the RCM woken up by the RD is not associated with the preferred RAT of the TD. In the example embodiment illustrated in FIG. 10, if the RCM woken up by the RD is not associated with the preferred RAT of the TD, the TD can redirect the RD to select an alternative RCM. As an illustrative example, the redirection from the TD is transmitted to the RD in response to the indication received from the RD and indicating that a RCM has been woken up.

Figure 11:
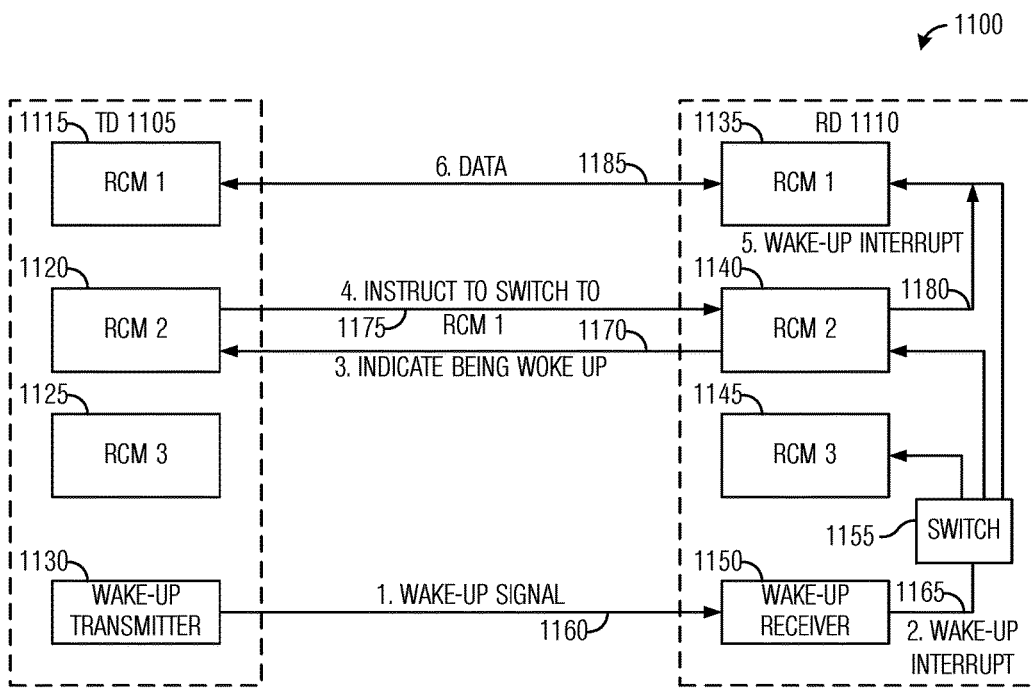
FIG. 11 illustrates an example communications system highlighting redirection by the TD according to example embodiments described herein.

FIG. 11 illustrates an example communications system 1100 highlighting redirection by the TD. Communications system 1100 includes a TD 1105 and a RD 1110. TD 1105 includes a plurality of RCMs, including RCMs 1115, 1120, and 1125. TD 1105 also includes a wake-up transmitter 1130. RD 1110 includes a plurality of RCMs, including RCMs 1135, 1140, and 1145. RD 1110 also includes a wake-up receiver 1150 and a switch 1155. Wake-up receiver 1150 is capable of receiving and processing wake-up signals addressed to RD 1110.

RD 1110 initially is in a reduced power state with RCMs 1135, 1140, and 1145 OFF and wake-up receiver 1150 and switch 1155 powered ON. TD 1105 transmits a wake-up signal to RD 1110 (shown as event 1160). Wake-up receiver 1150 receives and processes the wake-up signal and verifies that the wake-up signal is intended for RD 1110 (by determining that an address included in the wake-up signal is equal to the address of RD 1110, for example). Then, wake-up receiver generates a wake-up interrupt (shown as event 1165). RD 1110 determines which RCM to wake up. Switch 1155 may be a logic function performed by a processor of RD 1110 for asserting the wake-up interrupt to wake up the RCM that RD 1110 determines to wake up. As shown in FIG. 11, RD 1110 wakes up RCM 1140, which may have best met the determination criterion of RD 1110. RD 1110 transmits an indication that RCM 1140 has been woken up to TD 1105 using RCM 1140 (shown as event 1170). However, the RAT associated with RCM 1140 is not a preferred RAT of TD 1105. Hence, TD 1105 transmits an instruction to RD 1110 to switch to a different RCM (shown as event 1175). As an illustrative example, the instruction provided to RD 1110 may specify the preferred RAT of TD 1105. Alternatively, the instruction provided to RD 1110 may simply instruct RD 1110 to select a different RCM. Upon receiving the instruction from TD 1105, RD 1110 wakes up a different RCM such as RCM 1135 as shown in FIG. 11 (shown as event 1180). For example, RCM 1140 may wake up RCM 1135 based on the instruction, as shown in FIG. 11. For another example, a processor of RD 1110 may wake up RCM 1135 after receiving the instruction from RCM 1140. In a situation wherein TD 1105 specifies the preferred RAT or a specific RCM, TD 1105 and RD 1110 may begin the exchange of data (shown as event 1185). However, in a situation where TD 1105 instructs RD 1110 to switch to a different RCM, RD 1110 may transmit an indication that another RCM has been woken up to TD 1105 prior to the exchange of data. It is noted that the redirection may occur several times before RD 1110 selects a RCM that is associated with the preferred RAT of TD 1105. It is noted that it is only necessary to have a single wake-up receiver, such as wake-up receiver 1150, be powered on to wake up any of the RCMs in the plurality of RCMs.

According to an example embodiment, a combination of both the TD and the RD determining which one of the plurality of RCMs to wake up is possible. As an illustrative example, consider a situation where a first RCM woken up by the RD but specified by the TD does not produce a response from the TD, then the RD may autonomously decide to wake up an alternative RCM with greater coverage.

Figure 12A:
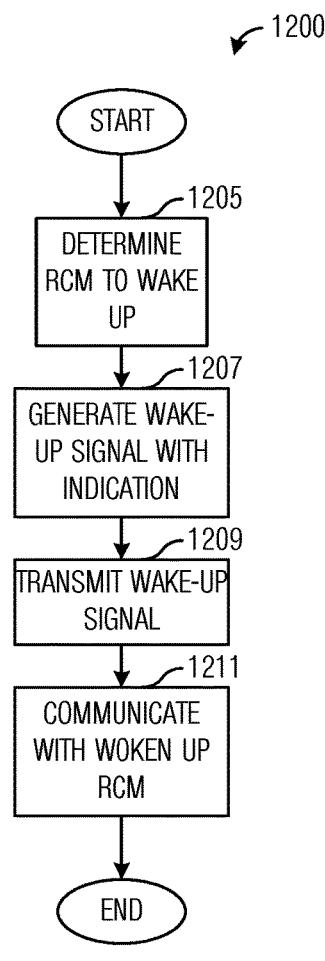
FIG. 12A illustrates a flow diagram of example operations occurring in a TD as the TD communicates with a RD, where the TD determines which one of a plurality of RCMs at the RD to wake up according to example embodiments described herein.

FIG. 12A illustrates a flow diagram of example operations 1200 occurring in a TD (such as TD 605 in FIG. 6 and TD 705 in FIG. 7) as the TD communicates with a RD (such as RD 610 in FIG. 6 and RD 710 in FIG. 7), where the TD determines which one of a plurality of RCMs at the RD to wake up. Operations 1200 may be indicative of operations occurring at a TD as the TD communicates with a RD, where the TD determines which RCM out of a plurality of RCMs at the RD to wake up.

Operations 1200 begin with the TD determining which RCM at the RD to wake up (block 1205). The TD may determine which RCM to wake up based on a determination criterion, such as a power consumption requirement, a latency requirement, a QoS requirement, a range requirement, a source of data, historical and usage information, and so on. The TD generates a wake-up signal with an indication of which RCM to wake up (block 1207). The TD transmits the wake-up signal (block 1209). The TD communicates with the RD, using the woken up RCM (block 1211).

Figure 12B:
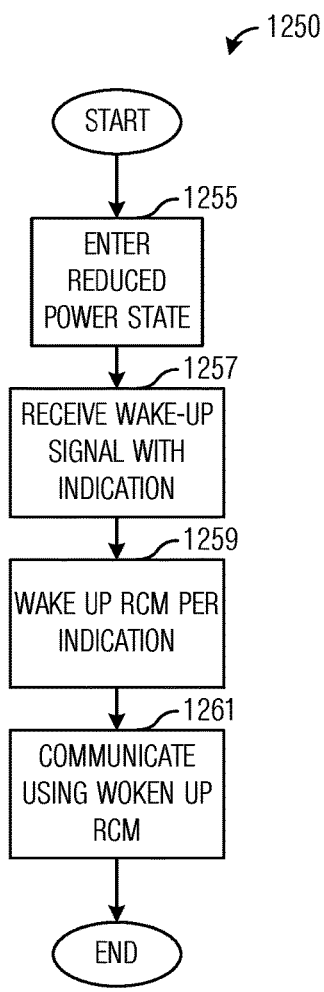
FIG. 12B illustrates a flow diagram of example operations occurring in a RD as the RD communicates with a TD, where the TD determines which one of a plurality of RCMs at the RD to wake up according to example embodiments described herein.

FIG. 12B illustrates a flow diagram of example operations 1250 occurring in a RD (such as RD 610 in FIG. 6 and RD 710 in FIG. 7) as the RD communicates with a TD (such as TD 605 in FIG. 6 and TD 705 in FIG. 7), where the TD determines which one of a plurality of RCMs at the RD to wake up. Operations 1250 may be indicative of operations occurring at a RD as the RD communicates with a TD, where the TD determines which RCM out of a plurality of RCMs at the RD to wake up.

Operations 1250 begin with the RD entering a reduced power state (block 1255). For example, the RD may enter the reduced power state by powering off a plurality of RCMs at the RD while activating a wake-up receiver. The RD receives a wake-up signal with an indication of which RCM to wake up (block 1257). For example, the RD receives the wake-up signal with its wake-up receiver (such as wake-up receiver 645 in FIG. 6 and wake-up receiver 750 in FIG. 7). The RD wakes up the indicated RCM if the wake-up signal is intended for the RD (block 1259). As an illustrative example, the wake-up signal is intended for the RD if an address (or identifier) included in the wake-up signal is equal to the address (or identifier) of the RD 710. The RD communicates with the TD using the woken up RCM (block 1261).

Figures 13A, 13B:
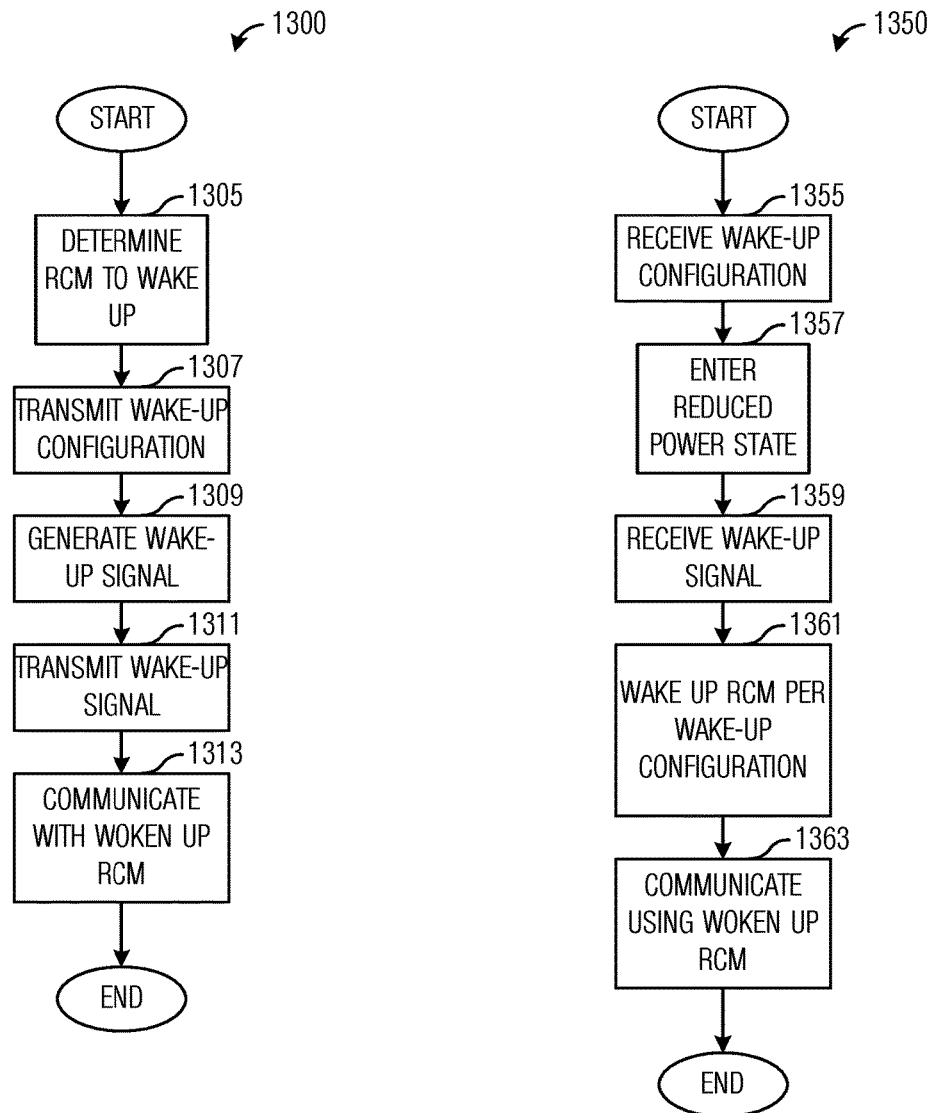
FIG. 13A illustrates a flow diagram of example operations occurring in a TD as the TD communicates with a RD, where the TD configures with the RD with regard to which one of a plurality of RCMs at the RD to wake up in response to a wake-up signal prior to waking up the RCM according to example embodiments described herein.
FIG. 13B illustrates a flow diagram of example operations occurring in a RD as the RD communicates with a TD, where the RD configures with the TD with regard to which one of a plurality of RCMs at the RD to wake up in response to a wake-up signal prior to waking up the RCM according to example embodiments described herein.

FIG. 13A illustrates a flow diagram of example operations 1300 occurring in a TD (such as TD 805 in FIG. 8 and TD 905 in FIG. 9) as the TD communicates with a RD (such as RD 810 in FIG. 8 and RD 910 in FIG. 9), where the TD configures with the RD with regard to which one of a plurality of RCMs at the RD to wake up in response to a wake-up signal prior to waking up the RCM. Operations 1300 may be indicative of operations occurring in a TD as the TD communicates with a RD, where the TD configures with the RD with regard to which one of a plurality of RCMs at a RD to wake up in response to a wake-up signal prior to waking up the RCM.

Operations 1300 begin with the TD determining which RCM at the RD to wake up (block 1305). The TD may determine which RCM to wake up based on a determination criterion, such as a power consumption requirement, a latency requirement, a QoS requirement, a range requirement, a source of data, historical and usage information, and so on. The determination criterion may be pre-set. Or, alternatively, the determining which RCM to wake up may be the result of a negotiation between the TD and the RD based on message exchanges using active RCMs. The TD transmits a wake-up configuration to a second RCM of the RD (block 1307) while the second RCM of the RD is active. The wake-up configuration includes information of a first RCM, such as an indication of the first RCM, which the TD has determined (in block 1305) to be the RCM that the RD is to wake up when a wake-up signal is received from the TD. The wake-up configuration may also include other information, such as a list of RCMs to wake up (with ordering based on preference or priority, for example), an error handling process (e.g., if the first RCM specified by the TD is not available (or failed) at the RD, and so on), and the like. The TD generates a wake-up signal (block 1309). The wake-up signal doesn't contain an explicit indication of the RCM of the RD, which the TD has determined that the RD is to wake up, i.e., the first RCM. The second RCM of the RD may be the same as the first RCM of the RD. Alternatively, the second RCM of the RD may be different from the first RCM of the RD. The TD transmits the wake-up signal (block 1311). The TD communicates with the RD, with the RD using the woken up RCM (block 1313).

FIG. 13B illustrates a flow diagram of example operations 1350 occurring in a RD (such as RD 810 in FIG. 8 and RD 910 in FIG. 9) as the RD communicates with a TD (such as TD 805 in FIG. 8 and TD 905 in FIG. 9), where the RD configures with the TD with regard to which one of a plurality of RCMs at the RD to wake up in response to a wake-up signal prior to waking up the RCM. Operations 1350 may be indicative of operations occurring in a RD as the RD communicates with a TD, where the RD configures with the TD with regard to which one of a plurality of RCMs at the RD to wake up in response to a wake-up signal prior to waking up the RCM.

Operations 1350 begin with the RD receiving a wake-up configuration from the TD (block 1355). The wake-up configuration may be associated with a RCM determined by the TD to be woken up by the RD (i.e., the first RCM as discussed previously), the determination made in accordance with a determination criterion, and the wake-up configuration transmitted by the TD to the RD. Alternatively, the RD receiving the wake-up configuration from the TD may be the result of a negotiation between the RD and the TD with message exchanges using active RCMs, the negotiation to determine a RCM to be woken up by the RD. The RD may receive the wake-up configuration using one of a plurality of RCMs at the RD while the one of the plurality of RCMs is active. The wake-up configuration may specify, after the plurality of RCMs at the RD being placed into a sleeping mode, which RCM of the plurality of RCMs at the RD to wake up when the RD receives a matching wake-up signal from the TD. Then, the RD enters a reduced power state (block 1357). For example, the RD may enter the reduced power state by powering off the plurality of RCMs at the RD while activating a wake-up receiver of the RD. The RD receives the matching wake-up signal from the TD (block 1359). In general, a wake-up signal is a matching wake-up signal when an address (or identifier) in the wake-up signal is equal to the address (or identifier) of the RD. For example, the RD receives the matching wake-up signal with its wake-up receiver (such as wake-up receiver 845 in FIG. 8 and wake-up receiver 950 in FIG. 9). The RD wakes up the RCM in accordance with the previous configuration of the current wake-up event (block 1361). The RD communicates with the TD using the woken up RCM (block 1363).

Figures 14A, 14B:
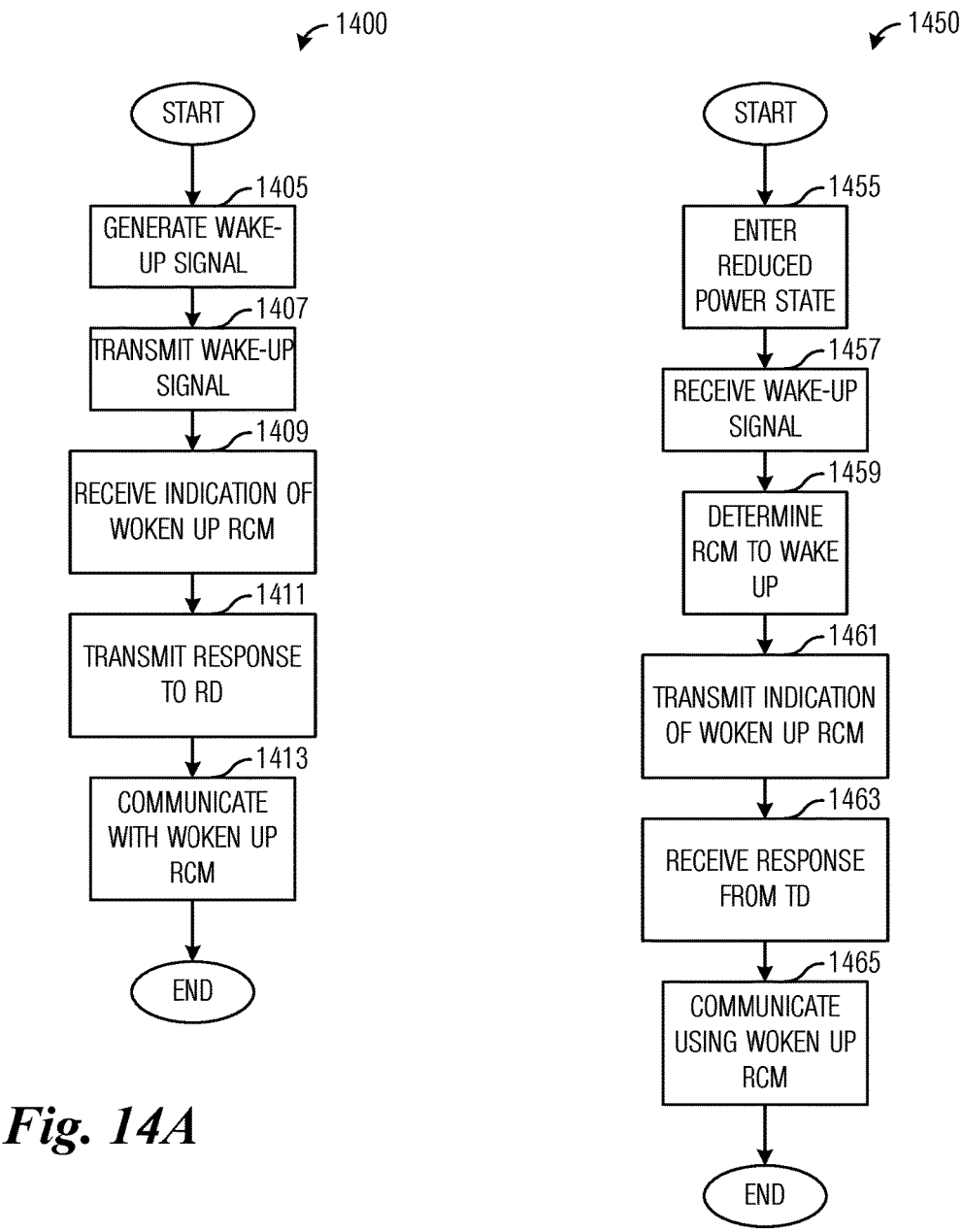
FIG. 14A illustrates a flow diagram of example operations occurring in a TD as the TD communicates with a RD, where the RD determines which RCM to wake up according to example embodiments described herein.
FIG. 14B illustrates a flow diagram of example operations occurring in a RD as the RD communicates with a TD, where the TD determines which RCM to wake up according to example embodiments described herein.

FIG. 14A illustrates a flow diagram of example operations 1400 occurring in a TD (such as TD 1005 in FIG. 10 and TD 1105 in FIG. ii) as the TD communicates with a RD (such as RD 1010 in FIG. 10 and RD 1110 in FIG. ii), where the RD determines which RCM to wake up. Operations 1400 may be indicative of operations occurring at a TD as the TD communicates with a RD, where the RD determines which RCM to wake up.

Operations 1400 begin with the TD generating a wake-up signal (block 1405). The TD transmits the wake-up signal (block 1407). The TD receives an indication of a woken up RCM (block 1409). The indication of the woken up RCM is received over a RAT associated with the woken up RCM. The TD transmits a response to the RD (block 1411). The response may be in the form of a data transmission or an acknowledgement accepting the woken up RCM for further communications. Alternatively, the response may be an instruction to the RD to switch to another RCM. The TD communicates with the RD, with the RD using the woken up RCM (block 1413). If the TD has a preference for a particular RAT, the TD may transmit an instruction to the RD instructing the RD to switch to the particular RAT or simply to switch RATs or RCMs. It is noted that if the response to the RD in block 1411 is a data transmission, then block 1413 may not occur if there is no additional information to exchange.

FIG. 14B illustrates a flow diagram of example operations 1450 occurring in a RD (such as RD 1010 in FIG. 10 and RD 1110 in FIG. ii) as the RD communicates with a TD (such as TD 1005 in FIG. 10 and TD 1105 in FIG. ii), where the TD determines which RCM to wake up. Operations 1400 may be indicative of operations occurring in a RD as the RD communications with a TD, where the RD determines which RCM to wake up.

Operations 1450 begin with the RD entering a reduced power state (block 1455). For example, the RD may enter the reduced power state by powering off a plurality of RCMs at the RD while activating a wake-up receiver. The RD receives a wake-up signal (block 1457). For example, the RD receives the wake-up signal with its wake-up receiver. If the wake-up signal is intended for the RD (e.g., an address of the wake-up signal is equal to the address of the RD), then the wake-up signal is intended for the RD. The RD determines which RCM to wake up (block 1459). The RD may determine which RCM to wake up based on a determination criterion, such as a power consumption requirement, a latency requirement, a QoS requirement, a range requirement, historical and usage information, and so on. The RD transmits an indication of the woken up RCM (block 1461). The indication may be transmitted using the woken up RCM. The RD receives a response from the TD (block 1463). The response from the TD may be in the form of a data transmission from the TD or an acknowledgement accepting the woken up RCM for further communications. Alternatively, the response from the TD may be an instruction from the TD to switch to a different RAT or RCM. An error may also occur where the RD does not receive any response from the TD before a timeout period expires, such as in the situation illustrated in FIG. 10. In such a situation, the RD automatically determines a different RCM to wake up. The RD communicates with the TD using the woken up RCM (block 1465). It is noted that if the response from the TD in block 1463 is a data transmission, then block 1465 may not occur if there is no additional information to exchange.

In a first aspect, the present application provides a method for waking up one of a plurality of RCMs of a first station. The method includes receiving, by the first station, a wake-up configuration from a second station, placing, by the first station, the plurality of RCMs of the first station into a sleeping mode, receiving, by the first station, a wake-up signal from the second station on an auxiliary low-power radio receiver of the first station, determining, by the first station, a first RCM of the plurality of RCMs to wake up in accordance with the wake-up configuration, and waking up, by the first station, the first RCM from the sleeping mode to communicate with the second station.

According to a first embodiment of the method according to the first aspect, the method includes communicating, by the first station, with the second station to determine the wake-up configuration. According to a second embodiment of the method according to any preceding embodiment of the first aspect or the first aspect as such, communicating with the second station to determine the wake-up configuration is performed using either the first RCM or a second RCM of the plurality of RCMs, where the second RCM is different from the first RCM. According to a third embodiment of the method according to any preceding embodiment of the first aspect or the first aspect as such, the wake-up configuration is determined in accordance with one or more of a power consumption requirement comparing a power consumption of each RCM of the first station, a latency requirement comparing a latency associated with waking up each RCM of the first station, a Quality of Service (QoS) requirement of an anticipated data transmission comparing QoS requirements supported by each of the RCMs of the first station, a range requirement comparing an estimated range between the first station and the second station with a communications range supported by each of the RCMs of the first station, or historical and usage information of the first station.

According to a fourth embodiment of the method according to any preceding embodiment of the first aspect or the first aspect as such, the wake-up configuration includes an indication of the first RCM. The wake-up configuration includes mappings of mapping indicator values to RCMs of the plurality of RCMs of the first station, the wake-up signal includes a mapping indicator, and determining the first RCM includes selecting the first RCM in accordance with the mappings and the mapping indicator. According to a fifth embodiment of the method according to any preceding embodiment of the first aspect or the first aspect as such, the method includes transmitting, by the first station, a RCM wake up indicator to the second station, detecting, by the first station, a time-out prior to receiving a response from the second station on the first RCM, determining, by the first station, a third RCM of the plurality of RCMs of the first station to wake up, waking up, by the first station, the third RCM, and communicating, by the first station, with the second station using the third RCM after waking up the third RCM.

In a second aspect, the present application provides a method for communicating with a first station having a plurality of RCMs is provided. The method includes transmitting, by a second station, a wake-up configuration for the first station, placing, by the second station, the plurality of RCMs of the first station into a sleeping mode, transmitting, by the second station, a wake-up signal intended for the first station, the wake-up signal configured to wake up a first RCM of the plurality of RCMs in accordance with the wake-up configuration, receiving, by the second station, a wake-up indication from a second RCM of the plurality of RCMs of the first station, and communicating, by the second station, data with the first station using a third RCM of the second station associated with the second RCM of the plurality of RCMs of the first station.

According to a first embodiment of the method according to the second aspect, the wake-up configuration comprises an indication of the first RCM. According to a second embodiment of the method according to any preceding embodiment of the second aspect or the second aspect as such, the method includes communicating, by the second station, with the first station to determine the wake-up configuration. According to a third embodiment of the method according to any preceding embodiment of the second aspect or the second aspect as such, communicating with the first station to determine the wake-up configuration is performed using a fourth RCM of the second station associated with one of the first RCM or a fifth RCM of the plurality of RCMs of the first station that is different from the first RCM.

According to a fourth embodiment of the method according to any preceding embodiment of the second aspect or the second aspect as such, the wake-up configuration is determined in accordance with one or more of a power consumption requirement comparing a power consumption of each RCM of the first station, a latency requirement comparing a latency associated with waking up each RCM of the first station, a Quality of Service (QoS) requirement of an anticipated data transmission comparing QoS requirements supported by each of the RCMs of the first station, a range requirement comparing an estimated range between the first station and the second station with a communications range supported by each of the RCMs of the first station, or historical and usage information of the first station.

According to a fifth embodiment of the method according to any preceding embodiment of the second aspect or the second aspect as such, the wake-up configuration includes mappings of mapping indicator values to RCMs the plurality of RCMs of the first station, the wake-up signal includes a mapping indicator, and the method further includes determining, by the second station, a value of the mapping indicator in the wake-up signal that corresponds to the first RCM in accordance with the mappings.

In a third aspect, the present application provides a first station is provided. The first station includes a processor, and a computer readable storage medium storing programming for execution by the processor. The programming including instructions to configure the first station to receive a wake-up configuration from a second station, place a plurality of RCMs of the first station into a sleeping mode, receive a wake-up signal from the second station on an auxiliary low-power radio receiver of the first station, determine a first RCM of the plurality of RCMs to wake up in accordance with the wake-up configuration, and wake up the first RCM from the sleeping mode to communicate with the second station.

According to a first embodiment of the first station according to the third aspect, the programming includes instructions to configure the first station to communicate with the second station to determine the wake-up configuration. According to a second embodiment of the first station according to any preceding embodiment of the third aspect or the third aspect as such, the wake-up configuration includes an indication of the first RCM. According to a third embodiment of the first station according to any preceding embodiment of the third aspect or the third aspect as such, the wake-up configuration includes mappings of mapping indicator values to RCMs of the plurality of RCMs of the first station, the wake-up signal includes a mapping indicator, and the programming includes instructions to configure the first station to select the first RCM in accordance with the mappings and the mapping indicator.

According to a fourth embodiment of the first station according to any preceding embodiment of the third aspect or the third aspect as such, the programming includes instructions to configure the first station to transmit a RCM wake up indicator to the second station, detect a time-out prior to receiving a response from the second station on the first RCM, determine a third RCM of the plurality of RCMs of the first station to wake up, wake up the third RCM, and communicate with the second station using the third RCM after waking up the third RCM.

In a fourth aspect, the present application provides a second station adapted to communicate with a first station having a plurality of RCMs is provided. The second station includes a processor, and a computer readable storage medium storing programming for execution by the processor. The programming including instructions to configure the second station to transmit a wake-up configuration for a first station, place a plurality of RCMs of the first station into a sleeping mode, transmit a wake-up signal intended for the first station, the wake-up signal configured to wake up a first RCM of the plurality of RCMs in accordance with the wake-up configuration, receive a wake-up indication from a second RCM of the plurality of RCMs of the first station, and communicate data with the first station using a third RCM of the second station associated with the second RCM of the plurality of RCMs of the first station.

According to a first embodiment of the second station according to the fourth aspect, he programming includes instructions to configure the second station to communicate with the first station to determine the wake-up configuration. According to a second embodiment of the second station according to any preceding embodiment of the fourth aspect or the fourth aspect as such, he wake-up configuration includes mappings of mapping indicator values to RCMs the plurality of RCMs of the first station, the wake-up signal includes a mapping indicator, and the programming includes instructions to configure the second station to determine a value of the mapping indicator in the wake-up signal that corresponds to the first RCM in accordance with the mappings.

Figure 15:
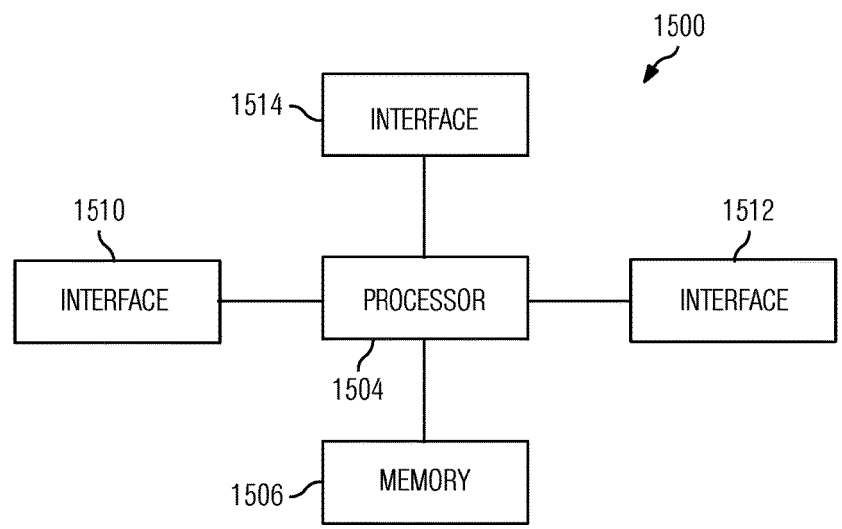
FIG. 15 illustrates a block diagram of an embodiment processing system for performing methods described herein.

FIG. 15 illustrates a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations and/or other processing related tasks, and the memory 1506 may be any component or collection of components adapted to store programming and/or instructions for execution by the processor 1504. In an embodiment, the memory 606 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC), etc.) to interact/communicate with the processing system 1500. The processing system 1500 may include additional components not depicted in FIG. 15, such as long term storage (e.g., non-volatile memory, etc.).

In some embodiments, the processing system 1500 is included in a network device that is accessing, or part otherwise of, a telecommunications network. In one example, the processing system 1500 is in a network-side device in a wireless telecommunications network, such as a base station, a relay station, a scheduler, a controller, a gateway, a router, an applications server, or any other device in the telecommunications network. In other embodiments, the processing system 1500 is in a user-side device accessing a wireless telecommunications network, such as a mobile station, a user equipment (UE), a personal computer (PC), a tablet, a wearable communications device (e.g., a smartwatch, etc.), or any other device adapted to access a telecommunications network.

Figure 16:
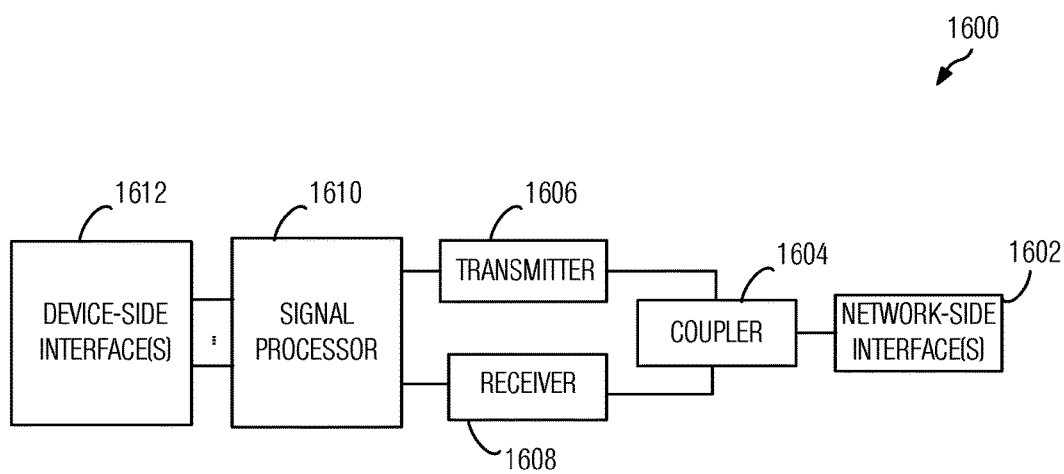
FIG. 16 illustrates a block diagram of a RCM adapted to transmit and receive signaling over a telecommunications network according to example embodiments described herein.

In some embodiments, one or more of the interfaces 1510, 1512, 1514 connects the processing system 1500 to a transceiver adapted to transmit and receive signaling over the telecommunications network. FIG. 16 illustrates a block diagram of a RCM 1600 adapted to transmit and receive signaling over a telecommunications network. The RCM 1600 may be installed in a host device. As shown, the RCM 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband signal into a modulated carrier signal suitable for transmission over the network-side interface 1602. A means for transmitting a wake-up signal may include transmitter 1606. The receiver 1608 may include any component or collection of components (e.g., down-converter, low noise amplifier, etc.) adapted to convert a carrier signal received over the network-side interface 1602 into a baseband signal. A means for receiving the wake-up signals may include receiver 1608. The signal processor 1610 may include any component or collection of components adapted to convert a baseband signal into a data signal suitable for communication over the device-side interface(s) 1612, or vice-versa. A means for determining a first RCM of the plurality of RCMs to wake-up and a means for waking up the first RCM from a sleeping mode may include signal processor 1610. The device-side interface(s) 1612 may include any component or collection of components adapted to communicate data-signals between the signal processor 1610 and components within the host device (e.g., the processing system 1500, local area network (LAN) ports, etc.).

The RCM 1600 may transmit and receive signaling over a wireless medium with any type of radio access technologies. For example, the RCM 1600 may be a wireless RCM adapted to communicate in accordance with a wireless telecommunications protocol, such as a cellular protocol (e.g., long-term evolution (LTE), etc.), a wireless local area network (WLAN) protocol (e.g., IEEE 802.11/Wi-Fi, etc.), or any other type of wireless protocol (e.g., Bluetooth, 802.15.4/ZigBee, LAA, MuLTEFire, near field communication (NFC), etc.). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the RCM 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a placing unit/module, a communicating unit/module, a detecting unit/module, and/or a wake-up unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for waking up one of a plurality of 802.11-compliant radio communications modules (RCMs) of a first station, the method comprising:
   receiving, by the first station, a wake-up configuration from a second station;
   placing, by the first station, the plurality of 802.11-compliant RCMs of the first station into a sleeping mode;
   receiving, by the first station, a wake-up signal from the second station on an auxiliary low-power radio receiver of the first station, the auxiliary low-power radio receiver being common to each RCM of the plurality of 802.11-compliant RCMs;
   determining, by the first station, a first RCM of the plurality of 802.11-compliant RCMs to wake up in accordance with the wake-up configuration;
   waking up, by the first station, the first RCM from the sleeping mode to communicate with the second station;
   transmitting, by the first station, an RCM wake up indicator to the second station;
   detecting, by the first station, a time-out prior to receiving a response from the second station on the first RCM;
   determining, by the first station, a third RCM of the plurality of 802.11-compliant RCMs of the first station to wake up;
   waking up, by the first station, the third RCM; and
   communicating, by the first station with the second station using the third RCM, after waking up the third RCM.

2. The method of claim 1, further comprising communicating, by the first station, with the second station to determine the wake-up configuration.

3. The method of claim 2, wherein communicating with the second station to determine the wake-up configuration is performed using either the first RCM or a second RCM of the plurality of 802.11-compliant RCMs, where the second RCM is a different RCM from the first RCM.

4. The method of claim 2, wherein the wake-up configuration is determined in accordance with one or more of a power consumption requirement comparing a power consumption of each RCM of the first station, a latency requirement comparing a latency associated with waking up each RCM of the first station, a Quality of Service (QoS) requirement of an anticipated data transmission comparing QoS requirements supported by each of the RCMs of the first station, a range requirement comparing an estimated range between the first station and the second station with a communications range supported by each of the RCMs of the first station, or historical and usage information of the first station.

5. The method of claim 1, wherein the wake-up configuration comprises an indication of the first RCM.

6. The method of claim 1, wherein the wake-up configuration comprises mappings of mapping indicator values to RCMs of the plurality of 802.11-compliant RCMs of the first station, wherein the wake-up signal includes a mapping indicator, and wherein determining the first RCM comprises selecting the first RCM in accordance with the mappings and the mapping indicator.

7. A method for communicating with a first station having a plurality of 802.11-compliant radio communications modules (RCMs) and an auxiliary low-power radio receiver common to each RCM of the 802.11 compliant RCMs, the method comprising:
   transmitting, by a second station, a wake-up configuration for the first station;
   placing, by the second station, the plurality of 802.11-compliant RCMs of the first station into a sleeping mode;
   transmitting, by the second station, a wake-up signal to the auxiliary low-power radio receiver of the first station, the wake-up signal configured to wake up a first RCM of the plurality of 802.11-compliant RCMs in accordance with the wake-up configuration;
   receiving, by the second station, a wake-up indication from a second RCM of the plurality of 802.11-compliant RCMs of the first station;
   determining, by the second station, that a third RCM of the second station, associated with the second RCM of the first station, is associated with a non-preferred radio access network of the second station;
   instructing, by the second station using the third RCM of the second station, the first station to switch to a different RCM; and
   communicating, by the second station, data with the first station using a fourth RCM of the second station associated with a fifth RCM of the plurality of 802.11-compliant RCMs of the first station, the fourth RCM being associated with a preferred radio access network of the second station.

8. The method of claim 7, wherein the wake-up configuration comprises an indication of the first RCM.

9. The method of claim 7, further comprising communicating, by the second station, with the first station to determine the wake-up configuration.

10. The method of claim 9, wherein communicating with the first station to determine the wake-up configuration is performed using a sixth RCM of the second station associated with one of the first RCM or a seventh RCM of the plurality of 802.11-compliant RCMs of the first station that is a different RCM from the first RCM.

11. The method of claim 7, wherein the wake-up configuration is determined in accordance with one or more of a power consumption requirement comparing a power consumption of each RCM of the first station, a latency requirement comparing a latency associated with waking up each RCM of the first station, a Quality of Service (QoS) requirement of an anticipated data transmission comparing QoS requirements supported by each of the RCMs of the first station, a range requirement comparing an estimated range between the first station and the second station with a communications range supported by each of the RCMs of the first station, or historical and usage information of the first station.

12. The method of claim 7, wherein the wake-up configuration comprises mappings of mapping indicator values to RCMs the plurality of 802.11-compliant RCMs of the first station, wherein the wake-up signal includes a mapping indicator, and wherein the method further comprises determining, by the second station, a value of the mapping indicator in the wake-up signal that corresponds to the first RCM in accordance with the mappings.

13. A first station comprising:
a plurality of 802.11-compliant radio communications modules (RCMs),
a non-transitory memory storage comprising instructions; and
one or more processors in communication with the non-transitory memory storage and the plurality of 802.11-compliant RCMs, wherein the one or more processors execute the instructions to:
receive a wake-up configuration from a second station,
place the plurality of 802.11-compliant RCMs into a sleeping mode,
receive a wake-up signal from the second station on an auxiliary low-power radio receiver of the first station, wherein the auxiliary low-power radio receiver is common to each RCM of the plurality of 802.11-compliant RCMs,
determine a first RCM of the plurality of 802.11-compliant RCMs to wake up in accordance with the wake-up configuration,
wake up the first RCM from the sleeping mode to communicate with the second station,
transmit a RCM wake up indicator to the second station,
detect a time-out prior to receiving a response from the second station on the first RCM,
determine a third RCM of the plurality of 802.11-compliant RCMs of the first station to wake up,
wake up the third RCM, and
communicate with the second station using the third RCM after waking up the third RCM.

14. The first station of claim 13, wherein the one or more processors execute the instructions to communicate with the second station to determine the wake-up configuration.

15. The first station of claim 13, wherein the wake-up configuration comprises an indication of the first RCM.

16. The first station of claim 13, wherein the wake-up configuration comprises mappings of mapping indicator values to RCMs of the plurality of 802.11-compliant RCMs of the first station, wherein the wake-up signal includes a mapping indicator, and wherein the one or more processors execute the instructions to select the first RCM in accordance with the mappings and the mapping indicator.

17. A second station configured to communicate with a first station, the first station having a plurality of 802.11-compliant radio communications modules (RCMs) and an auxiliary low-power radio receiver common to each RCM the 802.11 compliant RCMs, the second station comprising:
a non-transitory memory storage comprising instructions; and
one or more processors in communication with the non-transitory memory storage, wherein the one or more processors execute the instructions to:
transmit a wake-up configuration for the first station,
place a plurality of the 802.11-compliant RCMs of the first station into a sleeping mode,
transmit a wake-up signal to the auxiliary low-power radio receiver of the first station, the wake-up signal configured to wake up a first RCM of the plurality of 802.11-compliant RCMs in accordance with the wake-up configuration,
receive a wake-up indication from a second RCM of the plurality of 802.11-compliant RCMs of the first station,
determine that a third RCM of the second station, associated with the second RCM of the first station, is associated with a non-preferred radio access network of the second station,
instruct, using the third RCM of the second station, the first station to switch to a different RCM, and
communicate data with the first station using a fourth RCM of the second station associated with a fifth RCM of the plurality of 802.11-compliant RCMs of the first station, wherein the fourth RCM is associated with a preferred radio access network of the second station.

18. The second station of claim 17, wherein the one or more processors execute the instructions to communicate with the first station to determine the wake-up configuration.

19. The second station of claim 17, wherein the wake-up configuration comprises mappings of mapping indicator values to RCMs the plurality of 802.11-compliant RCMs of the first station, wherein the wake-up signal includes a mapping indicator, and wherein the one or more processors execute the instructions to determine a value of the mapping indicator in the wake-up signal that corresponds to the first RCM in accordance with the mappings.

20. The second station of claim 17, wherein the wake-up configuration comprises an indication of the first RCM.

21. The second station of claim 17, wherein the one or more processors execute the instructions to determine the wake-up configuration in accordance with one or more of a power consumption requirement comparing a power consumption of each RCM of the first station, a latency requirement comparing a latency associated with waking up each RCM of the first station, a Quality of Service (QoS) requirement of an anticipated data transmission comparing QoS requirements supported by each of the RCMs of the first station, a range requirement comparing an estimated range between the first station and the second station with a communications range supported by each of the RCMs of the first station, or historical and usage information of the first station.

* * * * *